(12) United States Patent
Yamamoto et al.

(10) Patent No.: US 6,594,219 B1
(45) Date of Patent: Jul. 15, 2003

(54) RECORDING AND/OR REPRODUCING DEVICE WITH HEAD SUSPENSION ARM ELEVATED IN A TWISTED STATE

(75) Inventors: Kazuyuki Yamamoto, Kanagawa (JP); Kazushige Kawazoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 09/624,316

(22) Filed: Jul. 24, 2000

(30) Foreign Application Priority Data

Jul. 22, 1999 (JP) .......................................... 11-207796

(51) Int. Cl.$^7$ ........................ G11B 33/02; G11B 21/22; G11B 5/54
(52) U.S. Cl. .................... 369/77.2; 360/255; 360/255.7
(58) Field of Search ...................... 369/77.2; 360/254.7, 360/254.8, 255, 254.3, 254.4, 254.6, 255.6, 255.7, 255.9, 255.2, 255.3, 255.5

(56) References Cited

U.S. PATENT DOCUMENTS

| | | | | |
|---|---|---|---|---|
| 4,663,682 A | * | 5/1987 | McNeil | 360/244.9 |
| 5,289,325 A | * | 2/1994 | Morehouse et al. | 360/254.8 |
| 5,644,451 A | * | 7/1997 | Chan et al. | 360/254.08 |
| 5,966,270 A | * | 10/1999 | Coon | 360/244.2 |
| 6,144,532 A | * | 11/2000 | Khan et al. | 360/255 |
| 6,201,666 B1 | * | 3/2001 | Resh | 360/255.9 |

* cited by examiner

Primary Examiner—Hoa T. Nguyen
Assistant Examiner—Julie Anne Watko
(74) Attorney, Agent, or Firm—Jay H. Maioli

(57) ABSTRACT

A recording and/or reproducing device having a magnetic head unit includes a slider having a magnetic head element fitted to the front end thereof, a head support arm carrying the slider fitted to the front end thereof and urged toward a disk and a ramp member for guiding the slider fitted to the head support arm from a stand-by position to a recording/reproducing position for recording information signals on or reproducing information signals from the disk and is adapted to record information signals on or reproduce information signals from the rotating disk. The ramp member pushes up the head support arm in a twisted state, so as to make the end of the slider located upstream relative to the other end in the sense of rotation of the disk to face upward relative to the disk when the slider is driven to move between the stand-by position and the recording/reproducing position.

6 Claims, 18 Drawing Sheets

RECORDING AND/OR REPRODUCING DEVICE WITH HEAD SUSPENSION ARM ELEVATED IN A TWISTED STATE

BACKGROUND OF THE INVENTION

Field of the Invention

This invention relates generally to a recording and/or reproducing device and, more particularly, to a recording/reproducing device that is adapted so that its magnetic head avoids collision with the disk-shaped recording medium being used when the head is driven to move to a recording/reproducing position for recording information signals on or reproducing information signals from the disk-shaped recording medium.

Description of the Background

Conventional disk recording/reproducing devices for use with a disk cartridge containing a hard disk as the recording medium typically have a cartridge receiving section for receiving a disk cartridge, a disk rotating/operating mechanism for rotating the hard disk contained in the disk cartridge, and a magnetic head unit for recording information signals on and reproducing information signals from the hard disk as it is rotated by the disk rotating/operating mechanism. The disk cartridge has a cartridge main body for rotatably containing the hard disk, and the cartridge main body is provided at the center thereof with a clamp section. The cartridge main body has a disk drive aperture located at the center in the bottom for allowing the disk rotating/operating mechanism to enter and drive the disk and has a recording/reproducing aperture located at the front wall thereof for allowing the magnetic head to enter. The disk drive aperture and the recording/reproducing aperture are provided with a shutter member that is fitted to the cartridge main body and operated to open and close the apertures. The magnetic head unit for recording information signals on and reproducing information signals from the hard disk includes a slider to which a magnetic head element is fitted and a head support arm carrying the slider fitted to the front end thereof.

When the disk recording/reproducing device having a configuration as described above receives a disk cartridge in the cartridge receiving section, it rotates and operates the shutter member to open both the disk drive aperture and the recording/reproducing aperture of the cartridge main body. Subsequently, the disk rotating/operating mechanism enters into the cartridge main body through the disk drive, clamps the hard disk by means of the clamp section and drives the hard disk at high speed so as to result in a constant angular velocity. Then, the head support arm that carries the slider fitted at its front end enters into the cartridge main body through the recording/reproducing aperture from a stand-by position to place the slider bearing the magnetic head unit at the recording/reproducing position on the hard disk, which is being driven to rotate at high speed. At this time, the slider is floated slightly above the hard disk by the air flow produced by the hard disk that is rotating at high speed. Thereafter, the magnetic head unit records information signals on, or reproduces information signals from, the hard disk as the magnetic head element fitted to the slider is driven to move radially relative to the rotating hard disk.

The distance at which the slider is floated above the hard disk that is being driven to rotate at high speed is reduced to tens of nanometers in current high-capacity hard disks. Therefore, in disk recording/reproducing devices of the type described above, the slider is required to move smoothly onto the hard disk when moving the slider to the recording/reproducing position. If the slider happens to collide with the hard disk as it is moved to the recording/reproducing position, it can damage the hard disk and/or the magnetic head element, thereby making it no longer possible to reliably record and reproduce information signals.

OBJECTS AND SUMMARY OF THE INVENTION

In view of the above circumstances, it is therefore an object of the present invention to provide a recording/reproducing device adapted to move the slider carrying the magnetic head element fitted thereto smoothly to the recording/reproducing position on the disk-shaped recording medium without the risk of contact between the head and the disk.

According to one aspect of the present invention, the above-identified problems are overcome by providing a recording and/or reproducing device having a disk rotating/operating mechanism for rotating a disk-shaped recording medium and a magnetic head unit including a slider having a magnetic head element fitted to the front end thereof, a head support arm carrying the slider fitted to the front end thereof and urged toward the disk-shaped recording medium, a ramp member for guiding the slider from a stand-by position to a recording/reproducing position, and a drive section for driving the magnetic head element to move across the disk-shaped recording medium rotated by the disk rotating/operating mechanism between the inner periphery and the outer periphery thereof, wherein the magnetic head unit is adapted to record information signals on or reproduce information signals from the disk-shaped recording medium rotated by the disk rotating/operating mechanism. The ramp member pushes up the head support arm in a twisted state so as to make the end of the slider located upstream in the sense of rotation of the disk-shaped recording medium to face upward relative to the disk-shaped recording medium when the slider is driven to move between the stand-by position and the recording/reproducing position.

DETAILED DESCRIPTIONS OF PREFERRED EMBODIMENTS

Figure 1:
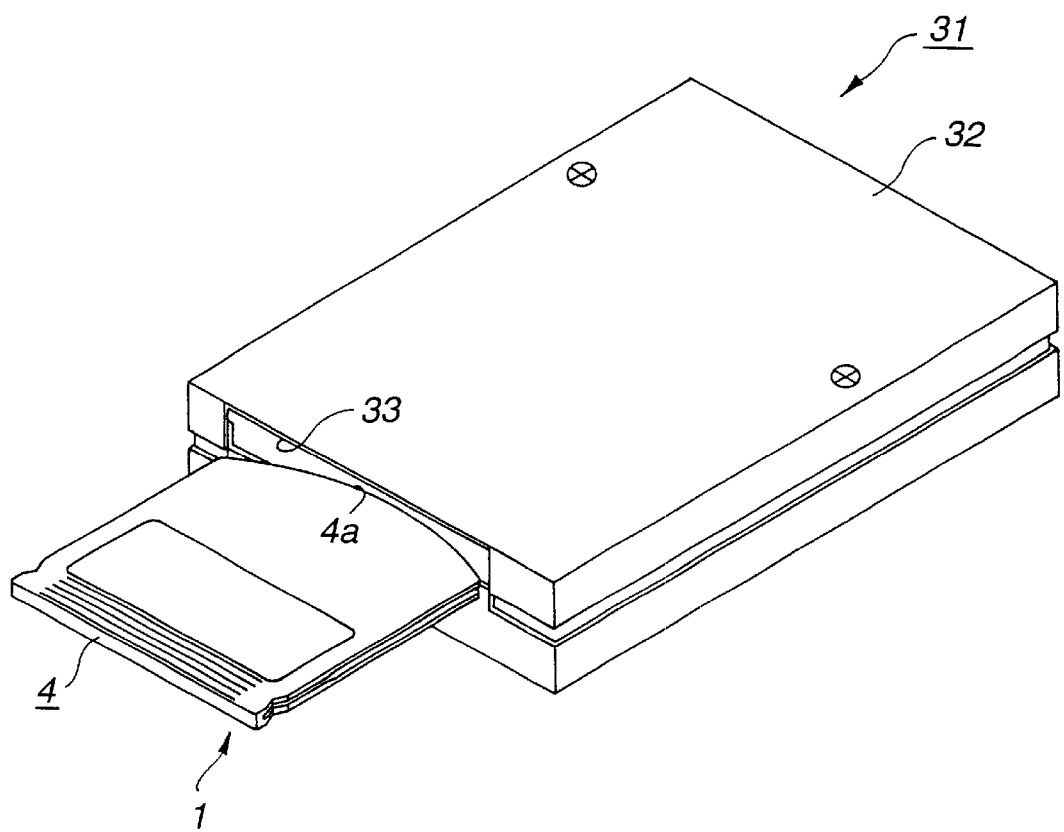
FIG. 1 is a schematic perspective view of an embodiment of disk recording/reproducing device according to the present invention having a disk cartridge inserted into it.
Figure 2:
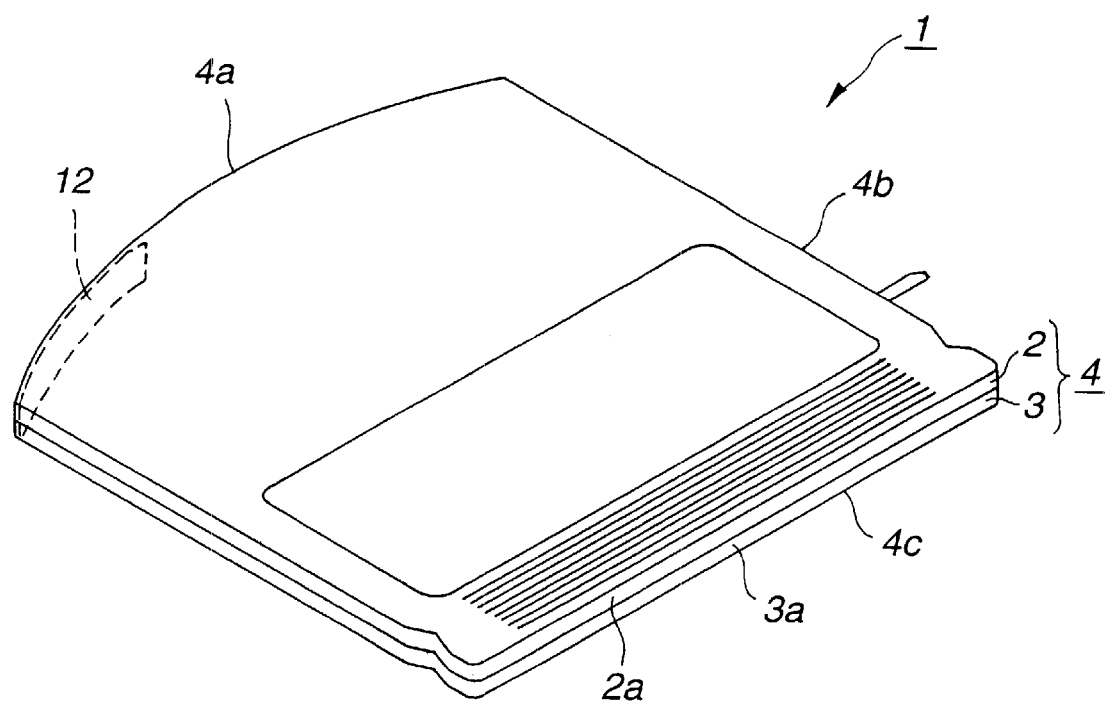
FIG. 2. is a schematic perspective view of a disk cartridge for use with the disk recording/reproducing device of FIG. 1.

Now, the present invention will be described by referring to the accompanying drawings that illustrate preferred embodiments of disk recording/reproducing device according to the present invention. Referring firstly to FIG. 1, an embodiment of a disk recording/reproducing device 31 according to the invention is adapted to operate for signal recording/reproducing with a disk cartridge 1 containing a hard disk as the recording medium. As shown in FIGS. 1 and 2, the disk cartridge 1 to be used with the disk recording/reproducing device 31 comprises a cartridge main body 4 formed by putting upper and lower halves 2, 3 together and binding them to each other along the peripheries thereof by means of a plurality of screws. The cartridge main body 4 contains a hard disk 5 to be used for recording information signals.

Figure 3:
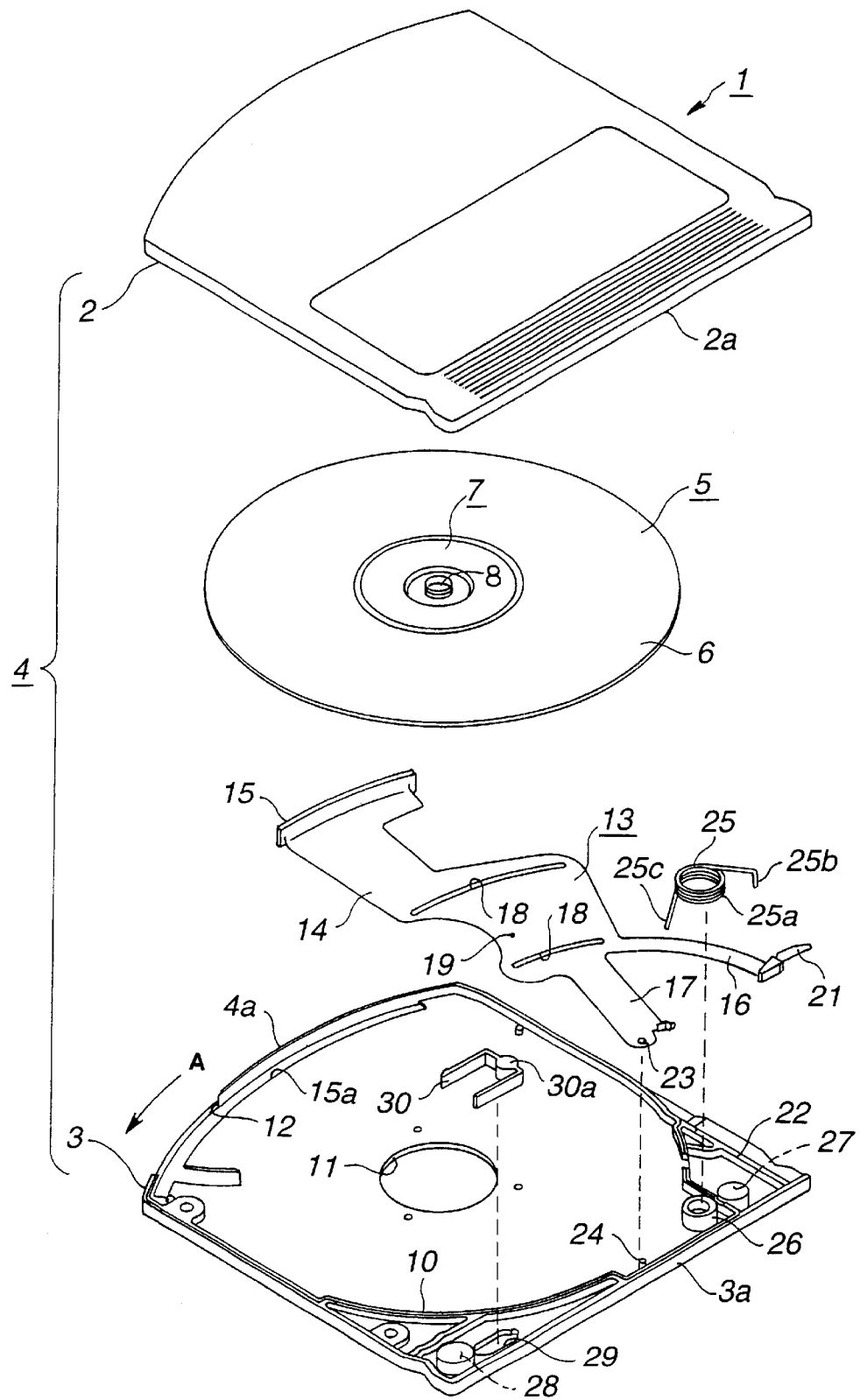
FIG. 3. is an exploded perspective view of the disk cartridge of FIG. 2.

Referring to FIG. 3, the hard disk 5 contained in the cartridge main body 4 has a disk main body 6 formed by coating a hard disk substrate with a magnetic layer and a protection layer. The hard disk main body 6 is provided with a central bore (not shown) into which a hub 7 is fitted operating as a clamp section for clamping the hard disk 5 to the disk rotating/operating mechanism of the disk recording/reproducing device 31. More specifically, the hub 7 is fitted to the disk main body 6 so as to close the central bore. The hub 7 is made of a magnetic material, so that it is magnetically attracted by and held to a magnet belonging to the disk rotating/operating mechanism. Additionally, the hub 7 is provided at the center thereof with a through hole 8 for receiving a spindle of the disk rotating/operating mechanism. Thus, as the disk rotating/operating mechanism is put into the through hole 8 of the hub 7 and the hub 7 is magnetically attracted by and held to the magnet, the hard disk will be aligned with the disk rotating/operating mechanism and driven to rotate integrally with the disk table of the disk rotating/operating mechanism.

Referring now to FIGS. 2 and 3, the cartridge main body 4 containing the hard disk 5 therein in a rotatable state is formed by putting the upper and lower halves 2, 3 together and binding them to each other, which halves 2, 3 are typically formed by injection molding synthetic resin. The front wall 4a of the cartridge main body 4, which forms the leading end when entering into the disk recording/reproducing device 31, has a substantially arcuate profile with a radius of curvature the same as that of the outer periphery of the hard disk 5 itself. The upper and lower halves 2, 3 are provided on respective inner surfaces thereof with substantially arcuate partition walls 10 inscribed in the respective peripheral walls 2a, 3a constituting the outer peripheral wall of the cartridge main body 4. The partition walls 10 define a disk containing section for rotatably containing the hard disk 5 when the upper and lower halves 2, 3 are put together.

The lower half 3 of the cartridge main body 4 forms the bottom of the cartridge main body 4 and is provided substantially at the center thereof with a disk drive aperture 11 through which the disk rotating/operating mechanism of the disk recording/reproducing device 31 enters. Note that the disk drive aperture 11 is formed only in the lower half 3 and the center of the upper half 2 forming the top of the cartridge main body 4 is completely closed. The substantially arcuate front wall 4a of the cartridge main body 4 is provided with a substantially rectangularly parallelepipedic recording/reproducing aperture 12, through which the magnetic head unit for recording information signals on and reproducing information signals from the hard disk 5 enters. The recording/reproducing aperture 12, also shown in FIG. 2, is so dimensioned that the magnetic head element of the slider fitted to the front end of the head support arm of the magnetic head unit that is inserted into the cartridge main body 4 may be operated across the hard disk 5 between the inner and outer peripheries thereof.

As mentioned above, the cartridge main body 4 having the disk drive aperture 11 and the recording/reproducing aperture 12 is provided with a shutter member 13 for opening and closing both the disk drive aperture 11 and the recording/reproducing aperture 12. As shown in FIG. 3, the shutter member 13 has a base section 14 operating as a first shutter 19 section for closing the disk drive aperture 11, a second shutter section 15 for closing the recording/reproducing aperture 12, a shutter opening arm 16 for rotating and operating the shutter member 13 and a support arm 17 for rotatably supporting the shutter member 13.

The base section 14 has a profile substantially the same as a flat panel and is adapted to slide on the lower surface of the cartridge main body 4. A pair of arcuate guide slots 18, 18 are formed in the base section 14 and arranged along the rotating direction of the shutter member 13. The guide slots 18, 18 are adapted to receive and become engaged with respective projections, not shown, standing up from the inner surface of the lower half 3 of the cartridge main body 4. The first shutter section 19 adapted to close the disk drive aperture 11 is arranged between the guide slots 18, 18 and substantially at the center of the base section 14.

As shown in FIG. 3, the second shutter section 15 is arranged for closing the recording/reproducing aperture 12 at the front end of the base section 14. More specifically, the second shutter section 15 has an arcuate profile and is standing up from the front end of the base section 14. The second shutter section 15 has a radius of curvature substantially the same as that of the front wall 4a of the cartridge main body 4 and is large enough to completely close the recording/reproducing aperture 12. The second shutter section 15 is located inside the front wall 4a and moves along a guide groove 15a arranged along the front wall to define the movable region of the second shutter section 15.

As shown in FIG. 3, the shutter opening arm 16 is formed integrally with the base section 14 and arranged to face one of the lateral walls 4b, shown in FIG. 2, of the cartridge main body 4 running substantially parallel to the direction along which the disk cartridge 1 is inserted into and removed from the disk recording/reproducing device 31. An engaging pawl 21 to be engaged with the shutter opening mechanism of the disk recording/reproducing device 31 is formed at the front end of the shutter opening arm 16. The engaging pawl 21 is located outwardly relative to a guide hole 22 formed along one of the lateral walls 4b at a position close to the rear wall 4c of the cartridge main body 4.

The support arm 17 for rotatably supporting the shutter member 13 is integrally formed with the base section 14 at the rear end side of the latter. The support arm 17 is provided at the front end thereof with a pin hole 23, which pin hole 23 is adapted to receive a pin 24 standing up from the inner surface of the lower half 3 of the cartridge main body 4 at a position close to the rear wall 4c. As a result, the shutter member 13 is arranged inside the cartridge main body 4 in such a way that it pivots on the pin 24 in the direction of arrow A and in the direction opposite to arrow A in FIG. 3 so as to close and open the disk drive aperture 11 and the recording/reproducing aperture 12.

The shutter member 13 having the above-described configuration is urged in the direction of arrow A in FIG. 3 to close the recording/reproducing aperture 12 by a helical coil spring 25. The base section 25a of the helical coil spring 25 is held in engagement with a support section 26 formed integrally with the lower half 3 of the cartridge main body 4 at a position near the rear wall 4c that is not occupied by the hard disk 5. One of the arms 25b of the helical coil spring 25 is anchored to the rear wall 4c of the cartridge main body 4, while the other arm 25c is held at a position close to the pin hole 23 of the support arm 17. The helical coil spring 25 urges the shutter member 13 in the direction of arrow A in FIG. 3 to close both the disk drive aperture 11 and the recording/reproducing aperture 12. The shutter member 13 opens the disk drive aperture 11 and the recording/reproducing aperture 12 only when the disk cartridge is received in the cartridge receiving section of the disk recording/reproducing device 31 and closes both the disk drive aperture 11 and the recording/reproducing aperture 12 when the disk cartridge is not in use to prevent any foreign objects such as pieces of dirt from entering the cartridge main body 4.

The lower half 3 of the cartridge main body 4 is also provided at a position close to the opposite corners of the rear wall 4c with positioning recesses 27, 28 for engagedly receiving respective positioning pins when the disk cartridge 1 is put into the disk recording/reproducing device 31. One of the positioning recesses 27, has a substantially circular cross section and operates as a reference, whereas the other positioning recess 28 is formed as a slit so as to be able to correct the engaging position relative to the corresponding positioning pins. An anti-misrecording hole 29 is cut through the lower half 3 of the cartridge main body 4 at a corner of the rear side thereof where the positioning recess 28 is formed and an anti-misrecording member 30 is shown ready to be inserted into the anti-misrecording hole 29. The anti-misrecording member 30 has an identification section 30a, and the identification system of the disk recording/reproducing device 31 recognizes whether the disk cartridge 1 is ready for recording or not by detecting the position of the identification section 30a that moves between a recording, position where information signals can be recorded on the hard disk 5, and a recording prohibited position, where recording of information signals on the hard disk 5 is prohibited.

When not in use, both the disk drive aperture 11 and the recording/reproducing aperture 12 of the disk cartridge 1 having the above-described configuration are closed by the shutter member 13. The user can easily recognize the right leading side of the disk cartridge 1 when he or she puts it into the disk recording/reproducing device 31 because of the substantially arcuate front wall 4a of the disk cartridge 1.

As the disk cartridge 1 is put into the disk recording/reproducing device 31 through the inlet/outlet port 33 of the disk recording/reproducing device 31 with the front wall 4a thereof operating as the leading edge, the engaging pawl 21 of the shutter member 13 is brought into engagement with the shutter opening mechanism of the disk recording/reproducing apparatus 31. Then, the engaging pawl 21 is moved toward the rear wall 4c of the cartridge main body 4 along the guide hole 22 to pivot the shutter member 13 in a direction opposite to the direction of arrow A in FIG. 3 so as to open both the disk drive aperture 11 and the recording/reproducing aperture 12. Thus, the disk cartridge 1 is received in the cartridge receiving section of the disk recording/reproducing device 31 with the disk drive aperture 11 and the recording/reproducing aperture 12 held in the open state. At the same time, the disk rotating/operating mechanism of the disk recording/reproducing device 31 enters into the disk cartridge 1 through the disk drive aperture 11 at the bottom of the cartridge main body 4 and magnetically attracts and clamps the hub 7 of the hard disk 5.

Then, as the hard disk 5 is driven to rotate by the disk rotating/operating mechanism, the slider that is carrying the magnetic head element and supported at the front end of the head support arm of the magnetic head unit of the disk recording/reproducing device 31 moves into the cartridge main body 4. More specifically, the slider carrying the magnetic head element is moved from the stand-by position to the recording/reproducing position on the hard disk 5, and thereafter it is moved radially for the operation of recording information signals on, or reproducing information signals from, the hard disk 5.

Figure 4:
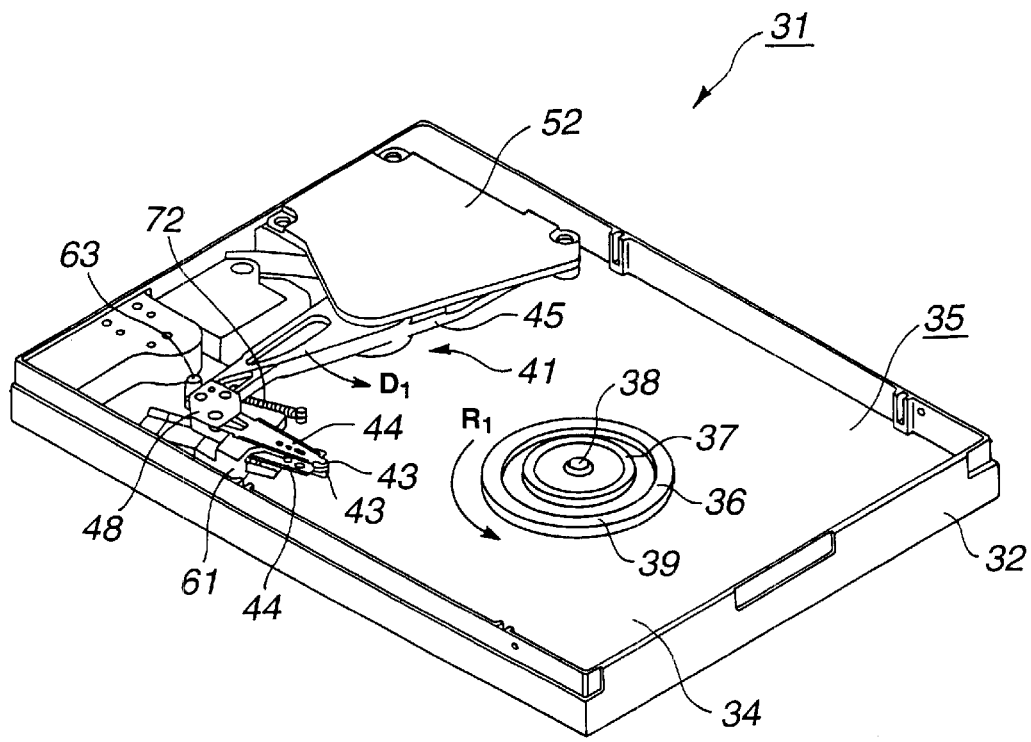
FIG. 4. is a schematic perspective view of another embodiment of a disk recording/reproducing device according to the present invention.

As described above, the disk cartridge 1 is put into and taken out of the disk recording/reproducing device 1 through the inlet/outlet port 33 formed at the front end of the device main body 32, as illustrated in FIG. 1. As shown in FIG. 4, the device main body 32 of the disk recording/reproducing device 31 comprises a base 35 having the cartridge receiving section 34 for receiving a disk cartridge 1 and a cartridge holder, not shown, for holding the disk cartridge 1 received in the cartridge receiving section 34. As the disk cartridge 1 is moved into the device main body 32 through the inlet/outlet port 33, the cartridge holder holds the disk cartridge 1 and lowers it toward the base 35 until it is completely received in the cartridge receiving section 34.

As seen from FIG. 4, the disk rotating/operating mechanism 36 for driving the hard disk 5 to rotate and the magnetic head unit 41 for recording information signals on and reproducing information signal from the hard disk 5 are arranged on the base 35.

As also shown in FIG. 4, the disk rotating/operating mechanism 36 for driving the hard disk 5 of the disk cartridge 1 received in the cartridge receiving section 34 has a disk table 37 for rotatably supporting the hard disk 5 at the hub 7. The disk table 37 is fitted to the spindle 38 to be passed through the through hole 8 of the hub 7 at the center thereof and has a disk supporting section 39 arranged around the spindle 38 to support the hard disk 5. A ring-shaped magnet, not shown, made of a magnetic material is arranged along the inner periphery of the disk supporting section 39 and is adapted to generate a uniform magnetic field around the spindle 38 in order to magnetically attract the hub 7. As the disk cartridge 1 is received in the cartridge receiving section 34, the disk table 37 enters into the cartridge main body 4 through the disk drive aperture 11 formed at the bottom of the cartridge main body 4 and magnetically attracts the hub 7 to rotatably support the hard disk 5. Then, the disk table 37 drives the hard disk 5 to rotate at a constant angular velocity in the sense of arrow R1 as shown in FIG. 4, while clamping the hard disk 5.

Figure 5:
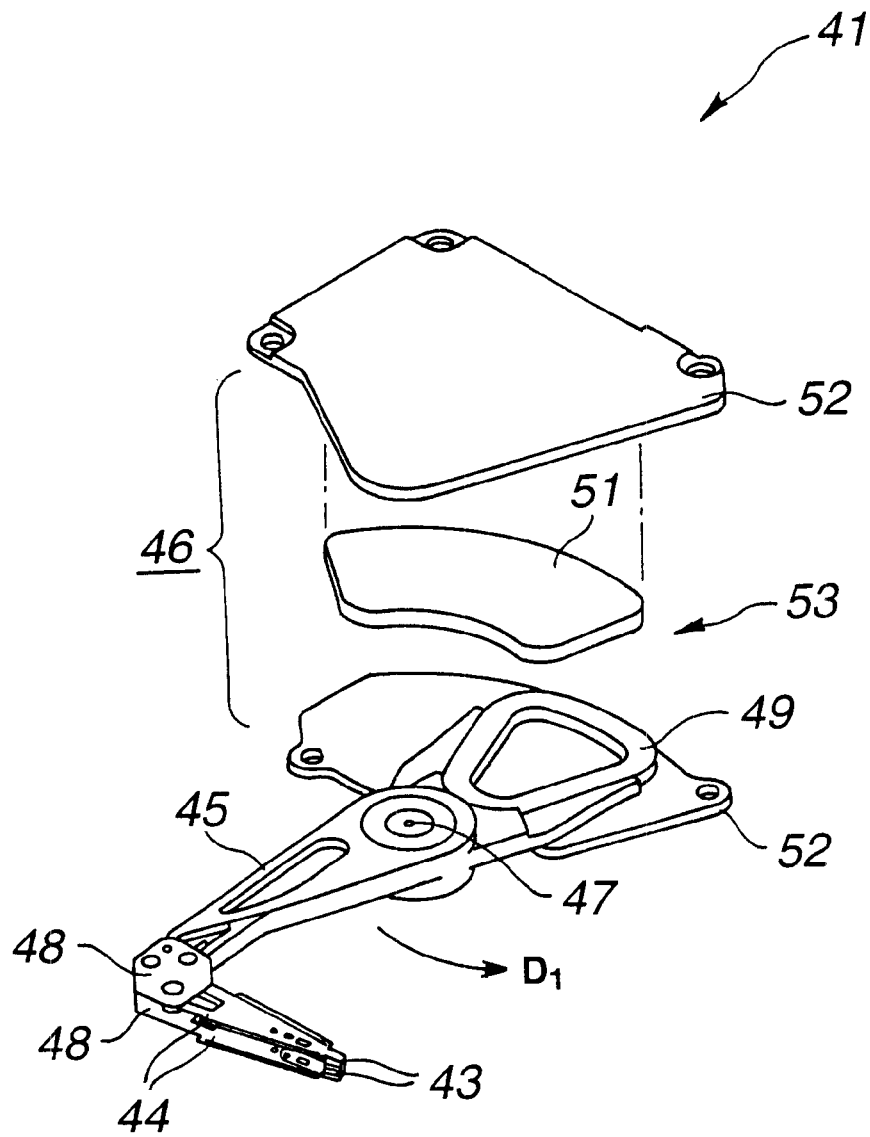
FIG. 5. is an exploded schematic perspective view of the magnetic head unit of the disk recording/reproducing device of FIG. 4.

As described above and as shown in FIG. 4, the magnetic head unit 41 for recording information signals on and reproducing information signals from the hard disk 5 is arranged on the base 35. As shown in FIG. 5, the magnetic head unit 41 of this embodiment comprises a pair of sliders 43, 43 carrying respective magnetic head elements 42, 42, shown in FIG. 6, at the front ends thereof for recording information signals on and reproducing information signals from a hard disk 5, a pair of head support arms 44, 44 carrying by turn the respective sliders 43, 43 at the front ends thereof, a rotary arm 45 for supporting the head support arms 44, 44 and a voice coil motor 46 for driving the rotary arm 45 to pivot.

The rotary arm 45 is supported by a shaft 47 standing from the base 35 at a middle part thereof so as to be driven to rotate both in the sense of arrow D1 and in the sense opposite to arrow D1 in FIGS. 4 and 5. The pair of head support arms 44, 44 are fitted to the front end of the rotary arm 45 to pinch the latter and run substantially rectangularly relative to the rotary arm 45. The pair of head support arms 44, 44 are provided at the bases thereof with respective link sections 48, 48 to be fitted to the rotary arm 45. Thus, the link sections 48, 48 of the head support arms 44, 44 are supported by the rotary arm 45 as they are secured to the front end of the rotary arm 45 by spot welding or by using a bonding agent or some other anchoring means. The pair of head support arms 44, 44 fitted to the rotary arm 45 are separated from each other by a gap large enough for receiving a hard disk 5 therebetween when the magnetic head unit enters into the cartridge main body 4 and large enough for preventing the sliders 43, 43 fitted to the front ends thereof from colliding with each other. The head support arms 44, 44 are formed by using leaf springs so as to operate as suspension elements. Thus, they can be resiliently deformed and bent toward and away from the signal recording surface of the hard disk 5 that is clamped by the disk rotating/operating mechanism 36.

The voice coil motor 46 for driving the rotary arm 45 to rotate comprises a drive coil 49 fitted to the base end of the rotary arm 45 and a magnetic circuit section 53 formed by a magnet 51 for generating a magnetic field and a pair of yokes 52, 52 fitted to the magnet 51 so as to pinch the latter. The rotary arm 45 is driven to rotate both in the sense of arrow D1 and in the sense opposite to arrow D1 in FIGS. 4 and 5 by the effect of a drive current fed to the drive coil 49 and the magnetic field of the magnetic circuit section 53. As the head support arms 44, 44 carrying the respective sliders 43, 43 at the front ends thereof are driven to pivot in the sense of D1 in FIGS. 4 and 5 by the voice coil motor 46, they are moved into the cartridge main body 4 and then across the hard disk 5 between the inner and outer peripheries thereof.

Figure 6:
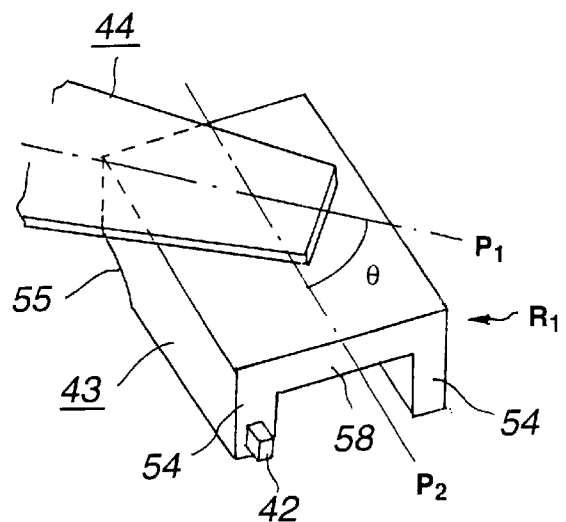
FIG. 6. is a schematic perspective view of the sliders fitted to the respective head support arms of the magnetic head unit of FIG. 5.
Figure 7:
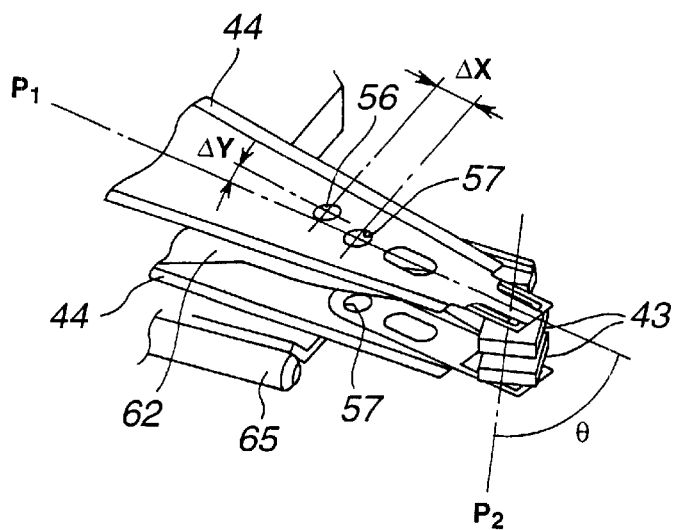
FIG. 7. is a schematic perspective view of the front ends and related parts of the head support arms of FIG. 6.

As shown in FIGS. 6 and 7, the pair of sliders 43, 43 fitted to the front ends of the respective head support arms 44, 44 is formed of a pair of guide rails 54, 54 for forming an air bearing between them and the hard disk 5 at opposite sides facing the hard disk 5 so as to define a recess 58 between the guide rails 54, 54. The guide rails 54, 54 are held substantially in parallel with the recording tracks on the hard disk 5 when the sliders 43, 43 are moved to face the signal recording surface of the hard disk 5. More specifically, as shown in FIGS. 6 and 7, the sliders 43, 43 are arranged in such a way that the angle θ between the center line P1 extending from the front end to the base of the head support arms 44, 44 and the center line P2 of the sliders 43, 43 running in parallel with the guide rails 54, 54 is between 45° and 135°. Additionally, tapered sections 55, 55 are formed on the respective sliders 43, 43 at a position upstream relative the guide rails 54, 54 in the sense of arrow R1 in FIG. 6 indicating the direction in which the hard disk 5 is driven to rotate or the side from which air flows in. The magnetic head element 42 is arranged at the ends of the respective sliders 43, 43 from which air flows out.

Figure 8:
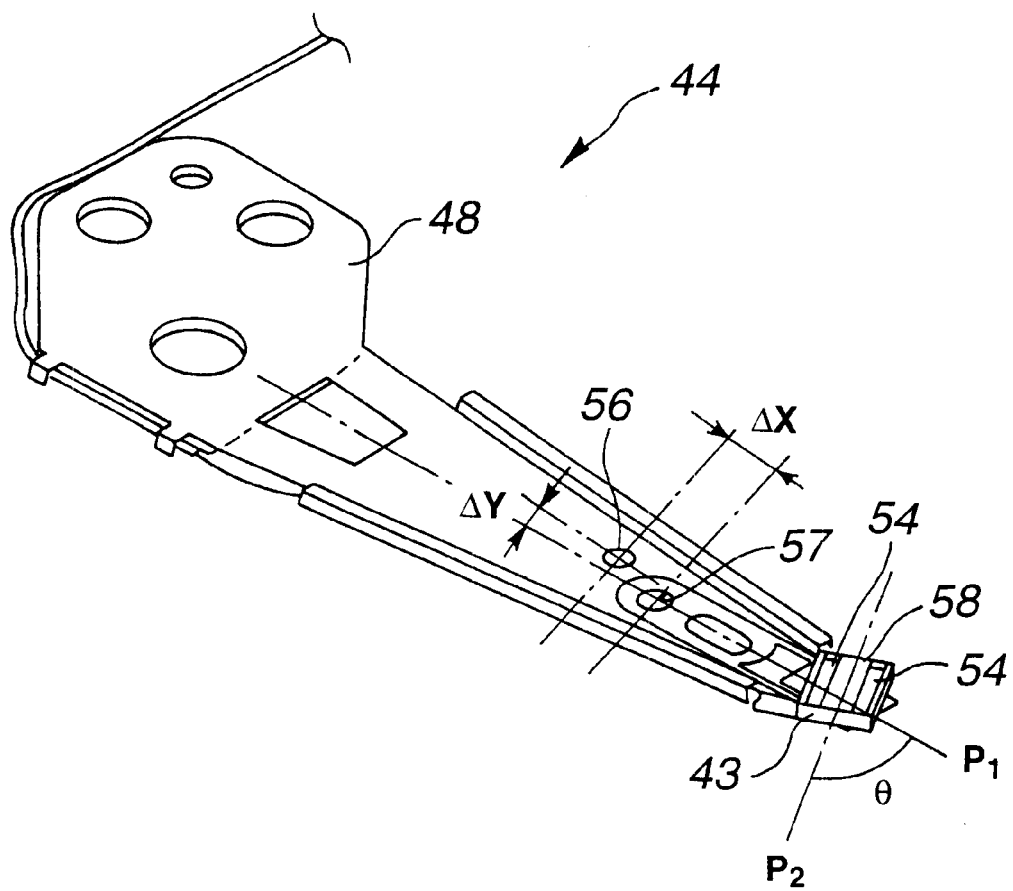
FIG. 8. is a schematic perspective view of a head support arm and a slider fitted thereto, illustrating the manner of assembly.

Meanwhile, as shown in FIGS. 7 and 8, projections 56, 56 are provided to be pressed against the ramp member, shown in FIG. 10, that reliably provides the necessary gap between the support arms 44, 44 in a manner described hereinafter are formed on the respective head support arms 44, 44. The projections 56, 56, which are to be pressed against the ramp member on the respective head support arms 44, 44, are respectively located relative to each other at positions offset from the reference holes 57, 57 formed on the center line P1 of the head support arms 44, 44 by a distance X (e.g., 1.5 mm) toward the base end of the head support arms 44, 44 and from the reference holes 57, 57 by a distance Y (e.g., 0.5 mm) toward the upstream location in the sense of rotation of the hard disk 5. Since the head support arms 44, 44 are located at positions offset from the center line P1 toward the upstream location in the sense of rotation of the hard disk 5, the head support arms 44, 44 are resiliently deformed to turn the ends of the sliders 43, 43 located upstream in the sense of rotation of the hard disk 5, upwardly when the sliders 43, 43 are moved from the stand-by position to the recording/reproducing position because they are pushed up by the ramp member in a manner described hereinafter.

Additionally, since the sliders 43, 43 are arranged in such a way that the angle θ FIG. 6 between the center line P1 of the head support arms 44, 44 and the center line P2 of the sliders 43, 43 arranged parallel to the guide rails 54, 54 is between 45° and 135° as described above, they are moved smoothly to the recording/reproducing position without colliding with the hard disk 5 when lifted respectively above the hard disk 5. If Δ X is 1.55 and Δ Y is 0.5 mm and angle θ is 60°, the angle of elevation of the sliders 43, 43 relative to the hard disk 5 will be 0.5°.

Figure 9:
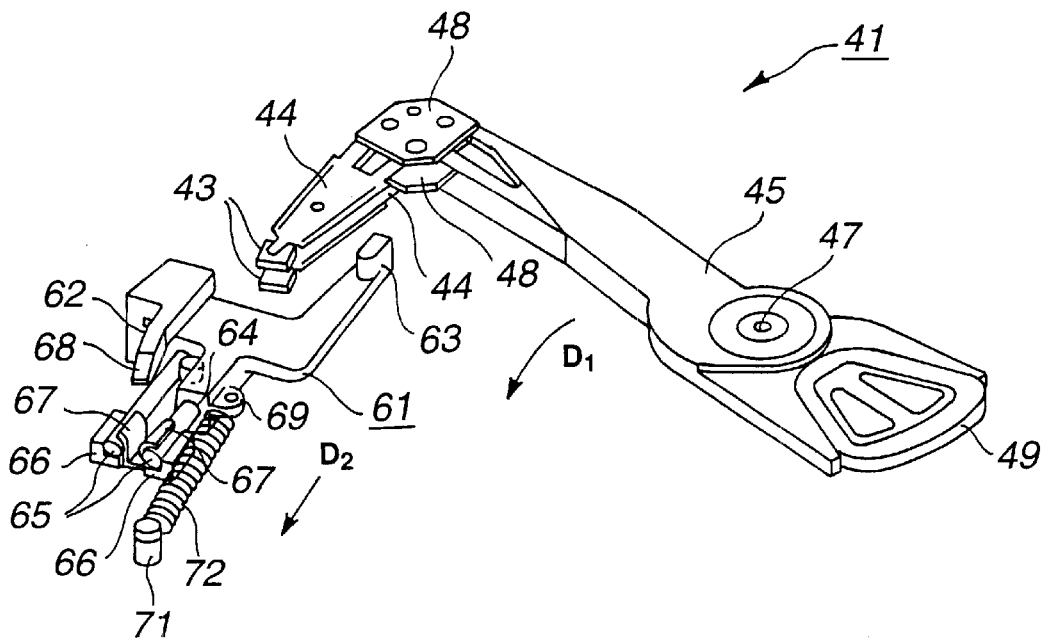
FIG. 9. is another exploded perspective view of the magnetic head unit of FIG. 5.

As shown in FIG. 9, the ramp member 61 is adapted to reliably provide a necessary gap between the head support arms 44, 44 when the sliders 43, 43 are moved from the stand-by position, located outside the cartridge main body 4 to the recording/reproducing position, located inside the cartridge main body 4, and includes a ramp arm 62 to be inserted between the pair of sliders 43, 43 and a press section 63 for pressing the rotary arm 45 to move the sliders 43, 43 to the side of the disk cartridge 1 received in the cartridge receiving section 34. A pair of guide holes 64, 64 used in moving the ramp member 61 toward the disk cartridge 1 received in the cartridge receiving section 63 are formed in the ramp member 61 and a pair of guide pins 65, 65 fitted to the base 35 are made to run through the respective guide holes 64, 64. More specifically, the guide pins 65, 65 are respectively held from above and from below by a pair of bearing blocks 66, 66 and a pair of keep platelets 67, 67 rigidly secured to the base 35. The ramp arm 62 is arranged above the guide pins 65, 65.

Figure 10:
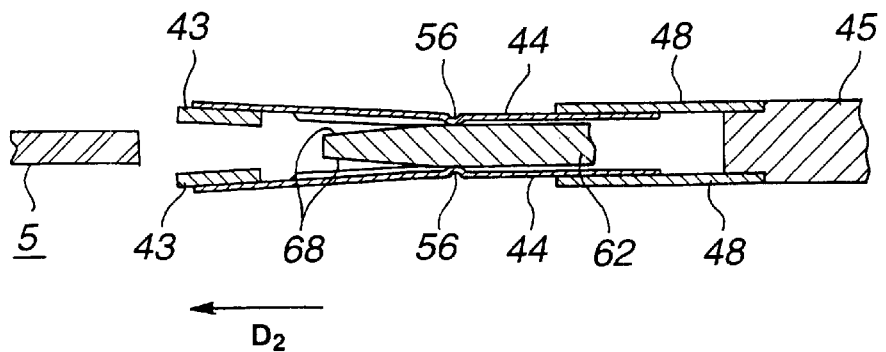
FIG. 10. is a schematic cross sectional view of the magnetic head unit, illustrating a front portion thereof when a ramp member is inserted between the paired head support arms.

As shown in FIGS. 9 and 10, the ramp arm 62 is located on the track of movement of the projections 56, 56 to be pressed against the ramp member that are formed on the respective head support arms 44, 44. A pair of slope surfaces 68, 68 are formed respectively on the upper and lower sides of the ramp arm 62 in a front end area thereof so as to allow the sliders 43, 43 to move smoothly to the recording/reproducing position and the projections 56, 56 to easily ride on the ramp arm 62 when the sliders 43, 43 return to the stand-by position.

The ramp member 61 is urged in the direction of arrow D2 in FIGS. 9 and 10 toward the disk cartridge 1 received in the cartridge receiving section 34 by a coil spring 72 that has one of its opposite ends anchored to a spring holder section 69 of the ramp member 61 and the other end anchored to a spring holder post 71 attached to the base 35.

When the sliders 43, 43 are moved from the stand-by position located outside the cartridge receiving section 34 to the recording/reproducing position located inside the cartridge receiving section 34, the projections 56, 56 of the head support arms 44, 44 that are carrying respective sliders 43, 43 abut the ramp arm 62 of the ramp member 61 having the above-described configuration. Thus, the ramp arm 62 by turn presses the projections 56, 56 so as to move the head support arms 44, 44 away from each other, while the spring-like arms 44, 44 constantly urge the sliders 43, 43 to move toward to each other. As a result, the sliders 43, 43 that are fitted to the respective head support arms 44, 44 and located vis-vis each other are separated from each other and prevented from colliding with each other when they are moved from the stand-by position to the recording/reproducing position. Since the projections 56, 56 formed on the respective head support arms 44, 44 are offset from the center line P1 toward the upstream in the sense of rotation of the hard disk 5, the head support arms 44, 44 are resiliently deformed to twist so as to turn the ends of the sliders 43, 43 located upstream in the sense of rotation of the hard disk 5 upwardly when the sliders 43, 43 are moved from the stand-by position to the recording/reproducing position. Therefore, the air flow caused by the rotating hard disk 5 can easily flow between the sliders 43, 43 through the gap separating the ends thereof where the tapered sections 55, 55 are formed so that the sliders 43, 43 float above the hard disk 5 whereon the air flow is formed without colliding with each other.

Referring to FIGS. 1–4, when the disk cartridge 1 is inserted into the disk recording/reproducing device 31 having the above-described configuration through the inlet/outlet port 33 formed at the front end of the device main body 32, the disk recording/reproducing device 31 operates in a manner as described below. As the disk cartridge 1 is inserted into the device main body 32 with the front wall 4a of the cartridge main body 4 operating as the leading edge, the disk cartridge 1 is held by the cartridge holder, not shown. At the same time, the shutter member 13 of the disk cartridge 1 is driven to pivot by the shutter opening mechanism of the disk recording/reproducing device 31 and opens both the disk drive aperture 11 and the recording/reproducing aperture 12. Thereafter, the cartridge holder holding the disk cartridge 1 moves toward the base 35 and places the disk cartridge 1 into the cartridge receiving section 34. Then, the disk table 37 of the disk rotating/operating mechanism 36 enters the disk cartridge 1 through the disk drive apparatus 11 and the disk rotating/operating mechanism 36 clamps the hard disk 5 by magnetically attracting the hub 7 and drives the hard disk 5 to rotate with the disk table 37 at a constant high angular velocity.

Figure 11A:
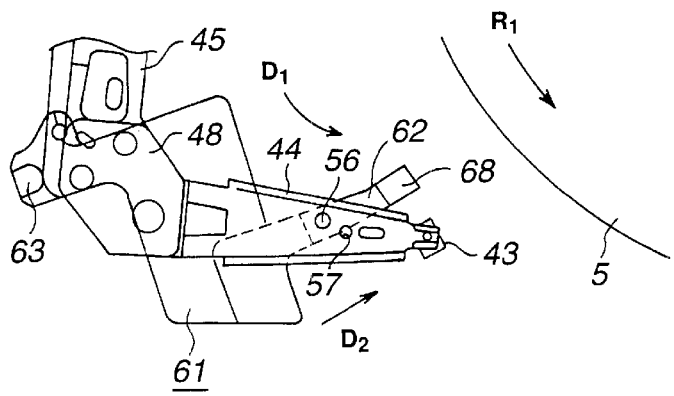
FIGS. 11(A)–11(C) are schematic plan views of a slider fitted to the front end of one of the head support arms in the embodiment of FIG. 10, illustrating how the support arm is moved from the stand-by position to the recording/reproducing position.

As shown further in FIGS. 5–7, while the hard disk 5 is driven to rotate at high speed by the disk rotating/operating mechanism 36, the sliders 43, 43 of the magnetic head unit 41 enter the disk cartridge 1 through the recording/reproducing aperture 12. More specifically, as shown in FIG. 11(A), when the sliders 43, 43 are located outside the disk cartridge 1 that has been received in the cartridge receiving section 34, it is rotated in the direction opposite to that of arrow D1 in FIG. 11(A). Since the ramp arm 62 of the ramp member 61 is interposed between the head support arms 44, 44 under this condition, the ramp arm 61 will abut the projections 56, 56. Thus, the head support arms 44, 44 are pressed by the ramp arm 62 to separate from each other in opposite directions so as to prevent the sliders 43, 43 from colliding with each other. Since the projections 56, 56 are offset upstream from the center line P1 of the head support arms 44, 44 in the sense of rotation of the hard disk 5, the head support arms 44, 44 are resiliently deformed to turn or twist upwardly the ends of the sliders 43, 43 located upstream relative to the sense of rotation the hard disk 5.

Figure 11B:
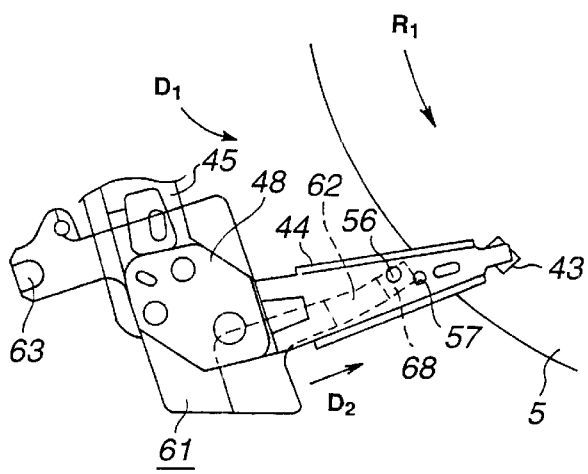

When the sliders 43, 43 are moved to the recording/reproducing position, the rotary arm 45 of the magnetic head unit 41 is pressed by the press section 63 of the ramp member 61 that is urged in the direction of arrow D2 in FIGS. 9 and 11(B) and pivoted in the sense of arrow D1 in FIGS. 4 and 11(B). Then, sliders 43, 43 enter into the disk cartridge 1 through the recording/reproducing aperture 12 and are moved to the recording/reproducing position on the hard disk 5 as shown in FIG. 11(B). Under this condition, the sliders 43, 43 are lifted to become air borne by the air flow generated on the flat surfaces of the hard disk 5 rotating at a high speed. Since the head support arms 44, 44 are pressed by the ramp arm 62 at the projections 56, 56 thereof under this condition, the ends of the sliders 43, 43 located upstream in the sense of rotation of the hard disk 5 are lifted upward. Therefore, the air flow can easily enter and move under the sliders 43, 43 from those ends so that the sliders 43, 43 are smoothly floated above the hard disk 5 and moved to the recording/reproducing position without colliding with the hard disk 5.

Figure 11C:
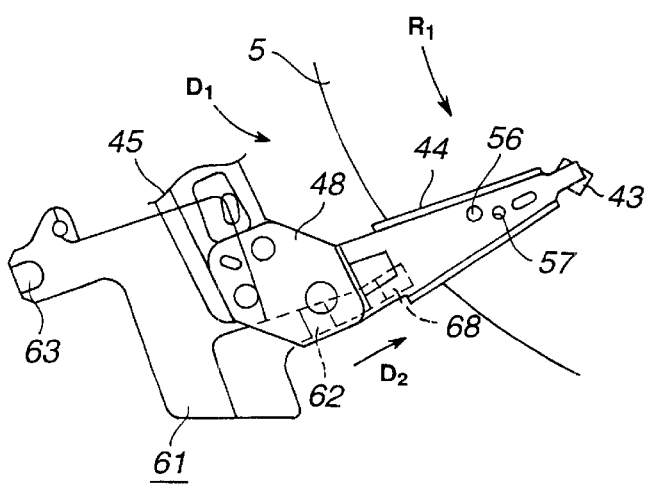

As the rotary arm 45 is further driven to rotate in the direction of arrow D1 as shown in FIG. 11(C), the projections 56, 56 of the head support arms 44, 44 are moved onto the hard disk 5 beyond the front the ramp arm 62 of the ramp member 61. Then, since the ramp arm 62 does not abut the projections 56, 56, the head support arms 44, 44 are released from the pressed condition and resiliently restored to their proper operating postures.

Now, the head support arms 44, 44 are made parallel to each other from the state where the ends of the sliders 43, 43 located upstream in the sense of rotation of the hard disk 5 are lifted upward and the sliders 43, 43 are held in a state where the magnetic head element 42 is ready for recording information signals on or reproducing information signals from the hard disk 5. Thereafter, the magnetic head unit 41 is driven to rotate further in the sense of arrow D1 and also in the sense opposite to arrow D1 such as in FIG. 4 by the voice coil motor 46 to record or reproduce information signals by means of the two magnetic head elements only one of which is shown at 42 in FIG. 6.

When the sliders 43, 43 are moved from the recording/reproducing position to the stand-by position in order to remove the disk cartridge 1 from the disk recording/reproducing device 31 or for some other purpose, the above-described sequence of operation is followed in reverse. More specifically, the rotary arm 45 is pivoted in the sense opposite to arrow D1 in FIG. 4 by the voice coil motor to follow the steps of FIGS. 11(C) through 11(A). Then, the rotary arm 45 operates to press the press section 63 of the ramp member 61 in the direction opposite to arrow D1 in FIG. 4 against the urging of the coil spring 72 and move the sliders 43, 43 out of the disk cartridge 1 and then to the stand-by position.

With the above-described disk recording/reproducing device 31, when the sliders 43, 43 are moved to the recording/reproducing position on the hard disk 5, the head support arms 44, 44 are pressed by the ramp arm 62 in a manner as described above so that the sliders 43, 43 are made to float above the hard disk 5 with their ends located upstream in the sense of rotation of the hard disk 5 lifted upward so as to be prevented from colliding with the hard disk 5, while the hard disk 5 is rotating at high speed. Thus, the disk recording/reproducing device 31 can reliably record or reproduce information signals without fear of damaging the hard disk 5.

Figure 12:
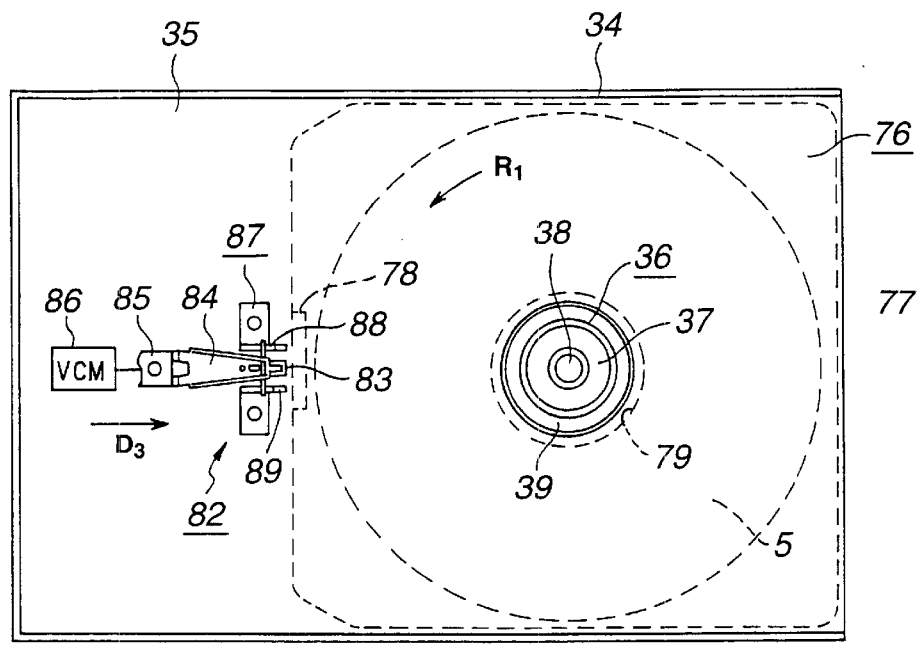
FIG. 12. is a schematic plan view of another embodiment of disk recording/reproducing device according to the present invention.

Another embodiment of the disk recording/reproducing device to which the present invention is applied is described below. Referring to FIG. 12, the disk recording/reproducing device 81 is characterized in that the magnetic head unit is designed to linearly move the sliders carrying respective magnetic head elements. Except for the magnetic head unit, the disk recording/reproducing device 81 has a configuration substantially the same as that of the above-described disk recording/reproducing device 31, so that common components are denoted by the same reference symbols and will not be described any further.

As shown in FIG. 12, the disk cartridge 76 to be used as the recording medium with the disk recording/reproducing device 81 comprises a substantially rectangularly parallelepiped-shaped cartridge main body 77 containing a hard disk 5. The cartridge main body 77 has a recording/reproducing aperture 78 for receiving the sliders of the magnetic head unit, which aperture 78 is formed substantially at the center of the front wall thereof that operates as the leading edge when the disk cartridge 76 is inserted into the disk recording/reproducing device 81. The cartridge main body 77 is also provided substantially at the center of the bottom thereof with a disk drive aperture 79 through which the disk rotating/operating mechanism enters. When not in use, the recording/reproducing aperture 78 and the disk drive aperture 79 of the cartridge main body 77 are closed by a shutter member, not shown, fitted to the cartridge main body 77 to prevent any foreign objects, such as pieces of dirt, from entering the cartridge main body 77. The apertures are opened when the disk cartridge 76 is inserted into the disk recording/reproducing device 81, and the shutter member is operated. Then, the disk rotating/operating mechanism 36 of the disk recording/reproducing device 81 enters into the disk cartridge 76 through the disk drive aperture 79 and the hard disk 5 is clamped by the disk rotating/operating mechanism 36 and driven to rotate at a constant, high, angular velocity. Thereafter, the sliders of the magnetic head unit 82 of the disk recording/reproducing device 81 enter into the disk cartridge 76 through the recording/reproducing aperture 78 and information signals are recorded on or reproduced from the hard disk 5 as the sliders are moved radially relative to the hard disk 5.

Figure 13:
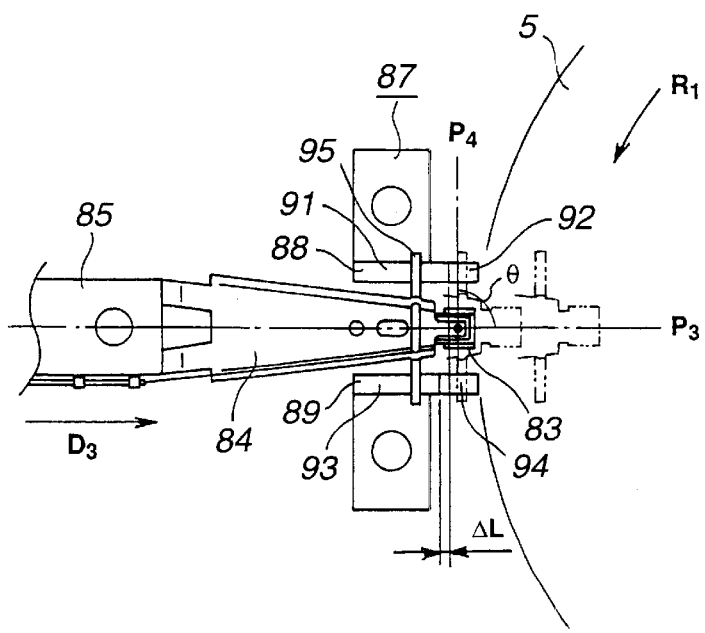
FIG. 13. is a schematic plan view of the magnetic head unit of the embodiment of disk recording/reproducing device of FIG. 12, illustrating a principal portion thereof.
Figure 14:
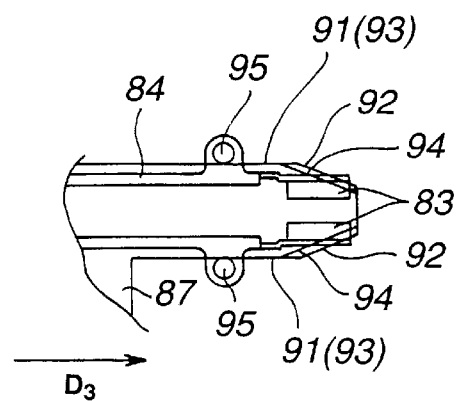
FIG. 14. is a schematic lateral view of the front end of the magnetic head unit of FIG. 13.

The disk recording/reproducing device 81 to be used with the disk cartridge 76 having the above-described configuration is provided on the base 35 thereof with a magnetic head unit 82 for recording information signals on and reproducing information signals from the hard disk 5 of the disk cartridge 76 that is received in the cartridge recording section 34. As shown in FIGS. 12, 13 and 14, the magnetic head unit 82 of this embodiment comprises a pair of sliders 83, 83 carrying respective magnetic head elements 42, 42, see FIG. 6, at the front ends thereof for recording information signals on and reproducing information signals from a hard disk 5, a pair of head support arms 84, 84 carrying by turn the respective sliders 83, 83 at the front ends thereof, a traveling/operating arm 85 carrying the head support arms 84, 84 at the front end thereof and a voice coil motor 86 for driving the traveling/operating arm 85 to move linearly along a radius of the disk 5.

The traveling/operating arm 85 is arranged so as to be guided by a guide member, not shown, disposed on the base 35 and driven to linearly move both in the sense of arrow D3 and in the sense opposite to arrow D3 in FIG. 12. The base sections of the pair of head support arms 84, 84 are secured to the front end of the traveling/operating arm 85 typically by spot welding or by means of a bonding agent. The two head support arms 84, 84 fitted to the front end of the traveling/operating arm 85 are separated from each other by a gap large enough for receiving a hard disk 5 therebetween when the magnetic head unit enters into the cartridge main body 77 and so as to prevent the sliders 83, 83 fitted to the front ends of the head support arms 84, 84 from colliding with each other. The head support arms 84, 84 are formed by using leaf springs so as to operate as suspension elements. Thus, they can be resiliently deformed and bent toward and away from the signal recording surface of the hard disk 5 that is clamped by the disk rotating/operating mechanism 36.

The voice coil motor 86 for driving the traveling/operating arm 85 to move linearly comprises a drive coil fitted to the base end of the traveling/operating arm 85 and magnets arranged along the opposite sides of the drive coil and hence along the moving direction of the traveling/operating arm 85. The voice coil motor 86 need not be described in greater detail. The traveling/operating arm 85 is driven to move linearly both in the sense of arrow D3 and in the sense opposite to arrow D3 in FIG. 12 by the effect of the drive current fed to the drive coil and the magnetic field of the magnets. As the head support arms 84, 84 fitted to the traveling/operating arm 85 are driven to move linearly in the sense of arrow D3 and in the sense opposite to arrow D3 in FIG. 12, the magnetic head elements 42, 42, see FIG. 6, fitted to the sliders 83, 83 are moved along a radial direction of the hard disk 5.

Like the above-described sliders 43, 43, the pair of sliders 83, 83 fitted to the front ends of the respective head support arms 84, 84 provide a pair of guide rails for forming an air bearing between the sliders 83, 83 and the hard disk 5 at opposite sides facing the hard disk 5, so as to define a recess between the guide rails. The guide rails are held substantially in parallel with the recording tracks on the hard disk 5 when the sliders 83, 83 are brought to face the signal recording surface of the hard disk 5. More specifically, the sliders 83, 83 are arranged in such a way that the angle e between the center line P3 extending from the front end to the base of the head support arms 84, 84 and the center line P4 of the sliders 83, 83 running in parallel with the guide rails is substantially equal to 90°.

Figure 15:
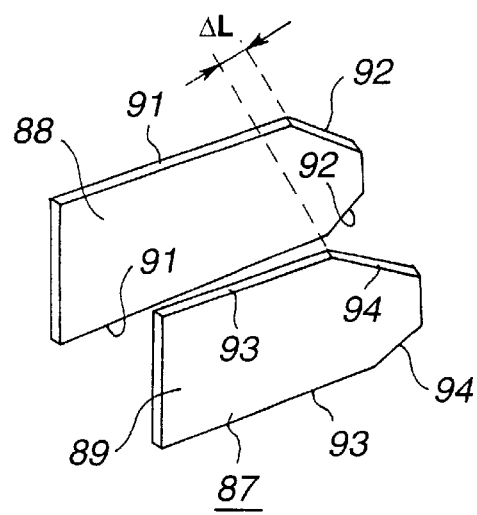
FIG. 15. is a schematic perspective view of the control platelets of the ramp member of FIG. 13 adapted to twist and deform the head support arms.

When the head support arms 84, 84 move the sliders 83, 83 from the stand-by position to the recording/reproducing position, they are resiliently deformed to turn the ends of the sliders 83, 83 located upstream in the sense of rotation of the hard disk 5 upward so that the sliders 83, 83 may move smoothly without colliding with the hard disk 5 and float above the rotating hard disk 5. The ramp member 87 for twisting and resiliently deforming the head support arms 84, 84 has a pair of control platelets 88, 89 arranged at the opposite sides of the head support arms 84, 84 near the front ends thereof as shown in FIGS. 13, 14 and 15. The control platelet 88 located upstream in the sense of rotation of the hard disk 5 is provided with a horizontal cam section 91 for horizontally moving the sliders 83, 83 fitted to the respective head support arms 84, 84 and an inclined cam section 92 for driving the sliders 83, 83 closer to the signal recording surface of the hard disk 5. On the other hand, the control platelet 89 located downstream in the sense of rotation of the hard disk 5 is provided with a horizontal cam section.93 for moving the sliders 83, 83 horizontally with the horizontal cam section 91 and an inclined cam section 94 for driving the sliders 83, 83 close to the signal recording surface of the hard disk 5. As shown in FIGS. 13 and 15, the starting point of the inclined cam section 92 of the control platelet 88 and that of the inclined cam section 94 of the control platelet 89 are offset by Δ L. The starting point of the inclined cam section 92 of the control platelet 88 is located closer to the hard disk 5 than the starting point of the inclined cam section 94 of the control platelet 89 and, hence, the horizontal cam section 91 is longer than the horizontal cam section 93. The inclined cam section 92 and the inclined cam section 94 have the same angle of inclination.

On the other hand, as shown in FIGS. 13 and 14, control pins 95 are respectively fitted to the front ends of the head support arms 84, 84 and arranged in a direction substantially perpendicular relative to the center line P3 of the head support arms 84, 84. The control pins 95 are respectively held in abutment with the horizontal cam sections 91, 93 and the inclined cam sections 92, 94 of the control platelets 88, 89.

When the sliders 83, 3 of the magnetic head unit 82 are moved from the stand-by position to the recording/reproducing position on the hard disk 5 in the cartridge main body 77, the disk recording/reproducing device 81 having the ramp member 87 operates in a manner as described below. As the disk cartridge 76 is put into the cartridge receiving section 34 while both the recording/reproducing aperture 78 and the disk drive aperture 79 are open, the disk table 37 of the disk rotating/operating mechanism 36 enters into the cartridge main body 77 through the disk drive aperture 79 and magnetically attracts the hub 7 to clamp the latter. Then, it drives the hard disk 5 with the disk table 37 at a high angular velocity.

As the hard disk 5 is driven to rotate at high speed by the disk rotating/operating mechanism 36, the sliders 83, 83 of the magnetic head unit 82 enter into the disk cartridge 76 through the recording/reproducing aperture 78. More specifically, when the sliders 83, 83 are located outside the disk cartridge that is put in the cartridge receiving section 34 as shown in FIG. 13, the control pins 95 of the head support arms 84, 84 are placed respectively on the horizontal cam sections 91, 93 of the control platelets 88, 89 and the sliders 83, 83 are separated from each other. Then, as the voice coil motor 86 is activated to drive the traveling/operating arm 85 in the direction of arrow D3 in FIG. 13, each of the control pins 95 fitted to the head support arms 84, 84 is moved to a position where the upstream end in the sense of rotation of the hard disk 5 as indicated by arrow R1 in FIG. 13 is located on the horizontal cam section 91 of the control platelet 88 while the downstream end in the sense of rotation of the hard disk 5 is located on the inclined cam section 94. As a result, the head support arms 84, 84 are twisted and the ends of the sliders 83, 83 located upstream in the sense of rotation of the hard disk 5 are turned upward. Thus, as the sliders 83, 83 are moved to the recording/reproducing position on the hard disk 5, they come to be floated above the hard disk 5 by the air flow formed on the hard disk 5 that is rotating at high speed. Under this condition, the air flow can easily enter and move under the sliders 83, 83 from those ends, so that the sliders 83, 83 are smoothly floated above the hard disk 5 and moved to the recording/reproducing position without colliding with the hard disk 5.

As the traveling/operating arm 85 is driven to move further in the direction of arrow D3 in FIG. 13 by the voice coil motor 86, the control pins 95 come to be located on the respective inclined cam sections 92, 94. Then, the head support arms 84, 84 are released from the twisted state for turning the related ends of the sliders 83, 83 upward and are caused to be parallel with each other. Thereafter, as the traveling/operating arm 85 is moved further in the direction of arrow D3 in FIG. 13, the control pins 95 are released from the state where they are lifted by the respective inclined cam sections 92, 94 and the traveling/operating arm 85 is moved both in the direction of arrow D3 and the direction opposite to arrow D3 in FIG. 13 by the voice coil motor that drives the sliders 83, 83 radially relative to the hard disk 5, so that the magnetic head elements 42, see FIG. 6, fitted to the sliders 83, 83 can record information signals on and reproduce information signals from the hard disk 5.

As described above, with the magnetic head unit 41 having the above-described configuration, the head support arms 84, 84 are twisted to raise the upstream ends of the sliders 83, 83 upward only when the sliders 83, 83 are initially moved to the recording/reproducing position, so that the head support arms 84, 84 are prevented from creeping.

Figure 16:
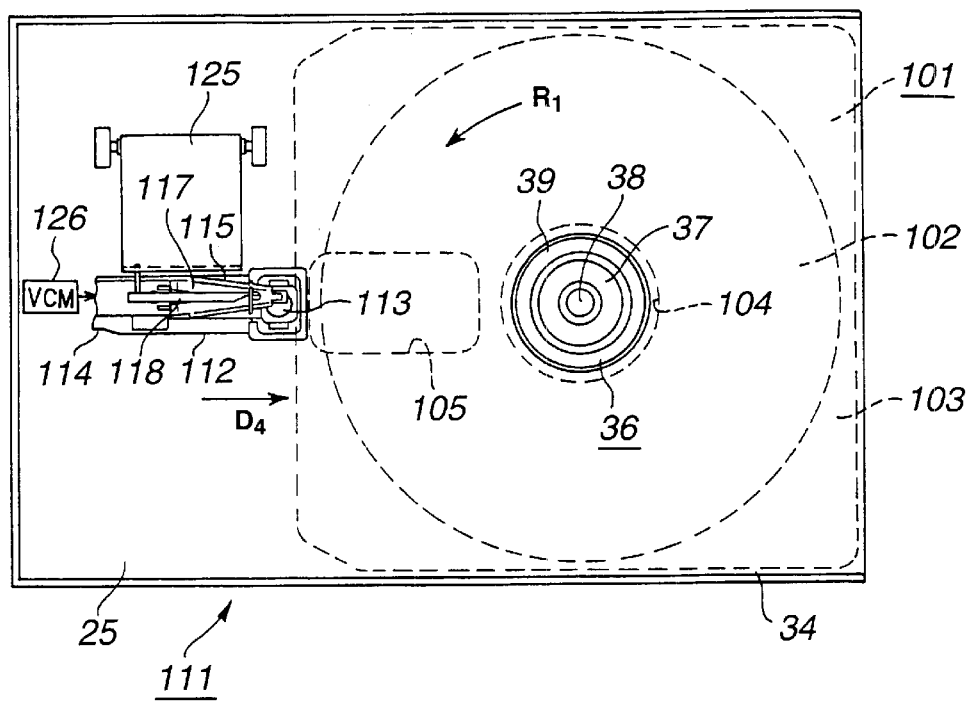
FIG. 16. is a schematic plan view of another embodiment of a disk recording/reproducing device according to the present invention and adapted to be used with a magneto-optical disk for recording/reproducing information signals.

Still another configuration of the disk recording/reproducing device to which the present invention is applied will be described below. Referring to FIG. 16, the disk recording/reproducing device 111 is characterized by using a magneto-optical disk as the recording medium. Since the disk recording/reproducing device 111 has a configuration substantially the same as that of the above-described disk recording/reproducing device 31, identical components are denoted by the same reference symbols and will not be described any further.

As shown in FIG. 16, the disk cartridge 101 to be used as the recording medium with the disk recording/reproducing device 111 comprises a cartridge main body 103 for containing a magneto-optical disk 102 and allowing it to rotate therein. The cartridge main body 103 is provided with a drive aperture 104 substantially at the center of the bottom thereof through which the disk rotating/operating mechanism 36 can enter. The cartridge main body 103 is also provided with a recording/reproducing aperture 105 extending from the front end to a center area on both the upper and lower surface thereof. The front end operates as the leading edge when the disk cartridge is inserted into the disk recording/reproducing device 111. When not in use, both the disk drive aperture 104 and the recording/reproducing aperture 105 of the cartridge main body 77 are closed by a shutter member movably fitted to the front side of the cartridge main body 103. Both the disk drive aperture 104 and the recording/reproducing aperture 105 are opened when the disk cartridge 101 is inserted into the disk recording/reproducing device 111 and the shutter member is operated. Then, the disk table 37 of the disk rotating/operating mechanism 36 enters into the disk cartridge 76 through the disk drive aperture 104 and the magneto-optical disk 102 is clamped by the disk table 37 and driven to rotate in the sense of arrow R1 in FIG. 16 at a constant, high, angular velocity. The magnetic head unit 115 enters into the cartridge main body 103 through the recording/reproducing aperture 105 formed at the top of the main body 103, while the objective lens of the optical pickup is placed vis-vis the recording/reproducing aperture 105 formed at the bottom of the main cartridge main body 103. Then, information signals are recorded on or reproduced from the magneto-optical disk 102 as the magnetic head unit and the optical pickup are radially moved relative to the magnetic disk 102 in a synchronized fashion.

The disk recording/reproducing device 111 to be used with a disk cartridge 101 having the above-described configuration is provided on the base 35 thereof with an optical pickup 112 for recording information signals on and reproducing information signals from the magneto-optical disk 102 of the disk cartridge 1 that is received in the cartridge recording section 34. As shown in FIG. 16, the optical pickup 112 is adapted to read the information signals recorded on the magneto-optical disk by irradiating the signal recording surface of the magneto-optical disk 102 with the light beam emitted from a light source that may be a semiconductor laser housed in the optical block by way of an objective lens 113 and detecting the return light beam reflected by the magneto-optical disk 102 by means of a photodetector housed in the optical block. The optical pickup 112 is fitted to a link member 114 so as to be linked to and moved in synchronism with the magnetic head unit 115.

Figure 17:
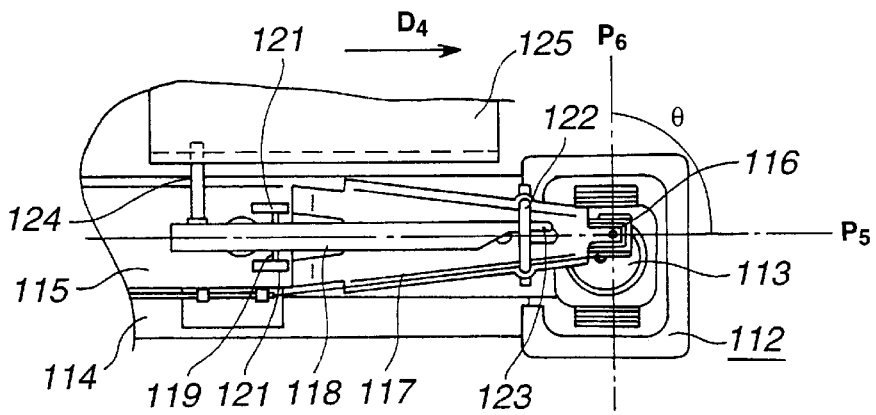
FIG. 17. is a schematic plan view of the magnetic head unit of the embodiment of FIG. 16.
Figure 18:
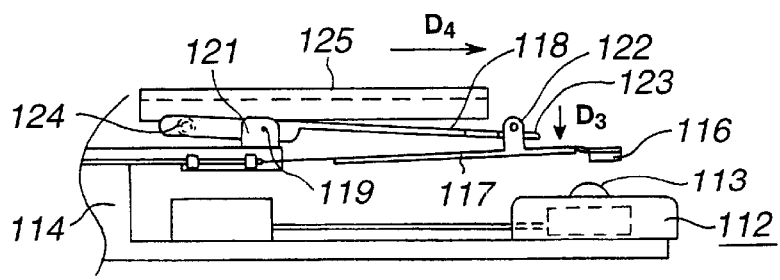
FIG. 18. is a schematic lateral view of the magnetic head unit of the embodiment of FIG. 16.

The magnetic head unit 115 is also fitted to the optical path pickup 112. As shown in FIGS. 17 and 18, the magnetic head unit 115 comprises slider 116 carrying thereon a magnetic head element 42, see FIG. 6, for applying a magnetic field to the magneto-optical disk 102 and a head support arm 117 carrying the slider 116 at the front end thereof.

The head support arm 117 carrying the slider 116 is formed by using a leaf spring so as to operate as a suspension element. Thus, it can be resiliently deformed and bent toward and away from the signal recording surface of the magneto-optical disk 102 that is clamped by the disk rotating/operating mechanism 36. The slider 126 is so arranged that it runs substantially in parallel with the recording track of the magneto-optical disk 102 when it is made to face the disk 102. More specifically, the slider 116 is arranged in such a way that the angle θ between the center line P5 extending from the front end to the base of the head support arms 117 and the center line P6 of the slider 116 is substantially equal to 90°.

When the head support arm 117 moves the slider 116 from the stand-by position to the recording/reproducing position, it is resiliently deformed to turn the end of the slider 116 located upstream in the sense of rotation of the magneto-optical disk 102 upward so that the slider 116 may move smoothly without colliding with the magneto-optical disk 102 and float above the rotating magneto-optical disk 102. As shown in FIGS. 17 And 18, the ramp member 118 for twisting and resiliently deforming the head support arm 117 is arranged so as to extend from the base to the front end of the head support arm 117 and supported at the middle thereof so as to be rotatable both in the sense of arrow D4 and in the sense opposite to arrow D4 in FIG. 18. More specifically, the ramp member 118 is supported as the pin 119 integrally formed with the ramp member 118 is pivotably supported by a support member 121 integrally formed with a link member 114 so as to be rotatable in the sense of arrow D4 and in the sense opposite to arrow D4 in FIG. 18. The ramp member 118 is urged in the direction of arrow D4 in FIG. 18 and its movement is confined by a limiter, not shown, so that its front end can not collide with the head support arm 117.

On the other hand, a control pin 122 is fitted to the front end of the head support arm 117 and arranged in a direction substantially perpendicular relative to the center line P5 of the head support arm 117. A press section 123 formed at the front end of the ramp member 118 is arranged to run between the control pin 122 and the head support arm 117. Thus, the press section 123 is formed at the front end of the ramp member 118 and arranged so as to positionally agree with the center line P5 of the head support arm 117. Additionally, it is biased toward the upstream side of the center line of the head support arm 117 in the sense of rotation of the magneto-optical disk 102. Therefore, as the ramp member 118 is rotated in the sense opposite to arrow D3 in FIG. 18, the head support arm 117 is pressed by the press section 123 at the upstream side thereof relative to the center line in the sense of rotation of the magneto-optical disk 102, so that the end of the slider 116 located upstream in the sense of rotation of the magneto-optical disk 102 is turned upward relative to the magneto-optical disk 102, as the slider 116 is fitted to the front end of the head support arm 117. Additionally, the ramp member 118 is provided with a rotation control pin 124 at the end thereof remote from the slider 116. Thus, as the rotation control pin 124 is pressed by press mechanism 125 arranged at the base 35, the ramp member 118 is driven to pivot upwardly in the sense opposite to arrow D3 in FIG. 18.

The link member 114 linking the magnetic head unit 115 and the optical pickup 112 is driven to move linearly both in the direction of arrow D4 and in the direction opposite to arrow D4 in FIG. 16 by a voice coil motor 126. Although not shown in detail, the voice coil motor 126 comprises a drive coil fitted to the base side of the link member 114 and magnets arranged along the opposite lateral sides of the drive coil in the direction of movement of the link member 114, so that the voice coil motor drives the traveling/operating arm 85 to move linearly both in the direction of arrow D4 and in the direction opposite to arrow D4 in FIG. 16 under the effect of the drive current fed to the drive coil and the magnetic field of the magnets. As the optical pickup 112 and the magnetic head unit 115 fitted to the link member 114 are driven to move linearly both in the direction of arrow D4 and in the direction opposite to arrow D4 in FIG. 16, the magnetic head element 42 and the objective lens 113 fitted to the slider are moved radially relative to the magneto-optical disk 102.

The disk recording/reproducing device 111 having the above-described configuration operates in a manner as discussed below for recording information signals to and reproducing information signals from the magneto-optical disk 102. As the disk cartridge 101 is put into the cartridge receiving section 34 while both the disk drive aperture 104 and the recording/reproducing aperture 105 are open, the disk table 37 of the disk rotating/operating mechanism 36 enters into the cartridge main body 77 through the disk drive aperture 79 and magnetically attracts the hub 7 to clamp the latter. Then, it drives the magneto-optical disk 102 with the disk table 37 at a high angular velocity.

When the magneto-optical disk 102 is driven to rotate at high speed for an operation of recording information signals thereon, the slider 116 of the magnetic head unit 115 enters into the disk cartridge 101 through the recording/reproducing aperture 105. More specifically, when the slider 116 of the magnetic head unit 115 is located outside the disk cartridge 101 as shown in FIG. 16, the rotation control pin 124 of the ramp member 118 is urged to move in the sense of arrow D3 in FIG. 18 without being pressed by the press mechanism 125. Therefore, the control pin 122 fitted to the head support arm 117 is not pressed by the press section 123 of the ramp member 118 and hence the head support arm 117 is not twisted. As the voice coil motor 126 is activated to drive the link member 114 to move in the direction of arrow D4 in FIGS. 16 through 18, both the optical pickup 112 and the magnetic head unit 115 fitted to the link member 114 are moved toward the disk cartridge 101 received in the cartridge receiving section 34 and the objective lens 113 of the optical pickup 112 and the slider 116 of the magnetic head unit 115 are placed vis-a-vis the recording/reproducing aperture 105 of the disk cartridge 101.

When the slider 116 of the magnetic head unit 115 is made to float above the magneto-optical disk 102, the rotation control pin 124 is pressed by the press mechanism 125 and the ramp member 118 is driven to rotate in the sense opposite to arrow D3 in FIG. 18 so that the press section 123 fitted to the front end of the ramp member 118 presses the control pin 122 of the head support arm 117. Then, as a result, the head support arm 117 is twisted in such a way that the end of the slider 116 located upstream in the sense of rotation of the magneto-optical disk 102 is turned upward. Thus, the slider 116 is placed at the recording/reproducing position on the magneto-optical disk 102. Then, it is caused to be floated above the magneto-optical disk 102 by the air flow formed on the surface of the magneto-optical disk 102 that is rotating at high speed. Under this condition, the air flow can easily enter under the slider 116 from that end so that the slider 116 is smoothly floated above the magneto-optical disk 102 and moved to the recording/reproducing position without colliding with the magneto-optical disk 102. Thereafter, the rotation control pin 124 of the ramp member 118 is released from the state of being pressed by the press mechanism 125 and the press section 123 of the ramp member 118 releases the control pin 122 of the head support arm 117 from the pressed state, so that the slider 116 is brought back to become parallel to the magneto-optical disk 102. Under this condition, the optical pickup 112 and the magnetic head unit 115 are driven to move both in the direction of arrow D4 and in the direction opposite to arrow D4 in FIGS. 16 through 18 in synchronism with the operation of the voice coil motor 126.

Then, the optical pickup 112 irradiates the predetermined area of the magneto-optical disk 102 with a light beam, while the magnetic head element 42, see FIG. 6, fitted to the slider 116 of the magnetic head unit 115 applies an external magnetic field there in order to read the information signals stored in the predetermined area of the magneto-optical disk 102. When reading information signals from the magneto-optical disk 102, the slider 116 of the magnetic head unit 115 is located outside the disk cartridge 101. In other words, the magnetic head unit 115 is not used when reading information signals. Therefore, the rotation control pin 124 of the ramp member 118 is not pressed by the press mechanism 125 and urged in the direction of arrow D3 in FIG. 18 and hence the control pin 122 fitted to the head support arm 117 is not pressed either by the press section 123 of the ramp member 118 so that the head support arm 117 is not twisted.

Thus, the head support arm 117 is twisted to turn the end of the slider 116 located upstream in the sense of rotation of the magneto-optical disk 102 upward only when the magnetic head unit 115 records information signals on the magneto-optical disk 102 and hence only when the slider 116 is moved to the recording/reproducing position, so that it is prevented from creeping.

Still another possible configuration of the disk recording/reproducing device to which the present invention is applied will be described below. Since the disk recording/reproducing device to be described below has a configuration substantially the same as that of the above-described disk recording/reproducing device 31, identical components are denoted by the same reference symbols and will not be described any further.

Figure 19:
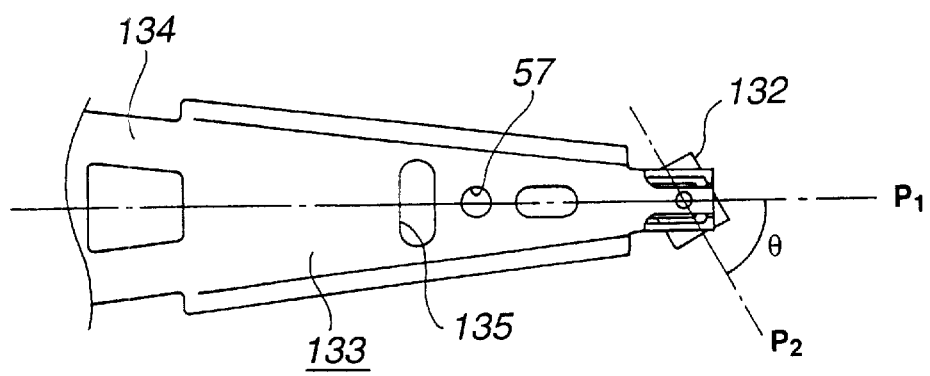
FIG. 19. is a schematic perspective view of the magnetic head unit of an embodiment of disk recording/reproducing device according to the present invention, illustrating a principal portion thereof.
Figure 21A:
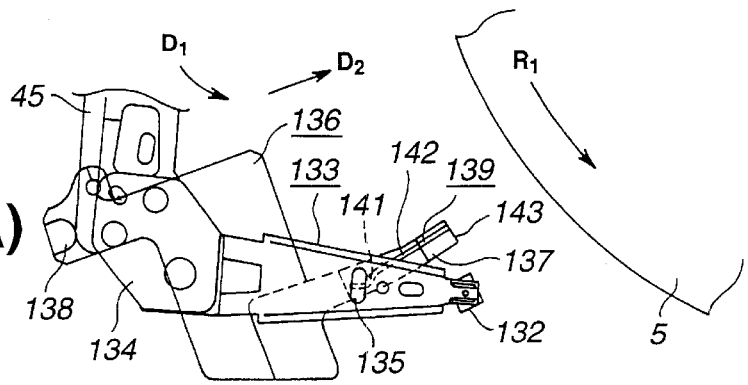
FIGS. 21(A)–21(C) are schematic plan views of a slider fitted to the front end of one of the head support arms in the embodiment of FIG. 20, illustrating how the support arm is moved from the stand-by position to the recording/reproducing position.
Figure 21B:
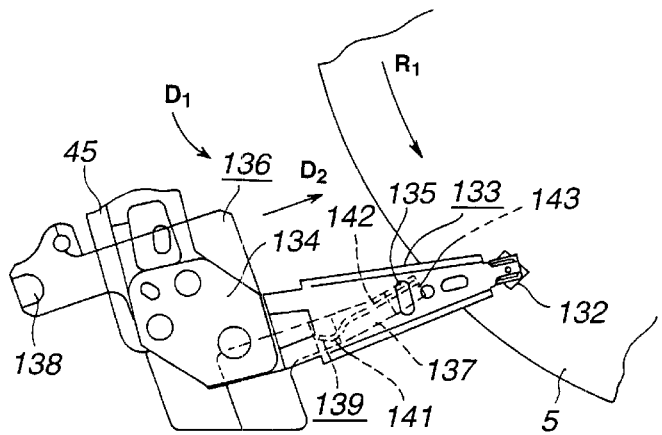
Figure 21C:
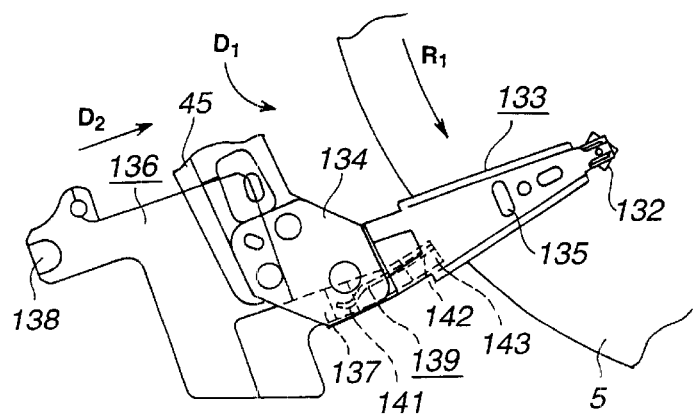

As shown in FIGS. 4 and 19, 21(C) the magnetic head unit 131 of this disk recording/reproducing device comprises a par of sliders 132, 132 carrying respective magnetic head elements 42, 42, see FIG. 6, at the front ends thereof for recording information signals on and reproducing information signals from a hard disk 5 and a pair of head support arms 133, 133 carrying by turn the respective sliders 132, 132 at the front ends thereof. As shown in FIGS. 4 and 21(A) the paired head support arms 133, 133 are fitted to the rotary arm 45 that is rotatably supported by a shaft 47 standing from the base 35. The rotary arm 45 is driven to rotate by a voice coil motor 46.

The pair of head support arms 133, 133 are provided at the bases thereof with respective link sections 134, 134 to be fitted to the rotary arm 45. Thus, the head support arms 133, 133 are fitted to the rotary arm 45 as the link sections 134, 134 of the head support arms 133, 133 are secured to the front end of the rotary arm 45 by spot welding, for example. More specifically, the head support arms 133, 133 are fitted to the rotary arm 45 to form an angle of about 90° relative to the rotary arm 45. They are fitted to the rotary arm 45 in such a way that the sliders 132, 132 at the respective front ends thereof are separated by a gap that allows the hard disk 5 to be placed therebetween and prevents them from colliding with each other when the head support arms 133, 133 enter into the cartridge main body 4.

Although not described in detail, the pair of sliders 132, 132 fitted to the front ends of the respective head support arms 133, 133 provide a pair of guide rails for forming an air bearing between them and the flat surfaces of the hard disk 5, at opposite sides facing the hard disk 5 so as to define a recess between the pair of guide rails. The guide rails are held substantially in parallel with the recording tracks on the hard disk 5 when the sliders 132, 132 are made to face the signal recording surface of the hard disk 5. More specifically, the sliders 132, 132 are arranged in such a way that the angle θ between the center line P1 extending from the front end to the base of the head support arms 133, 133 and the center line P2 of the sliders 132, 132 running in parallel with the guide rails is formed to be between 45° and 135°.

Figure 20:
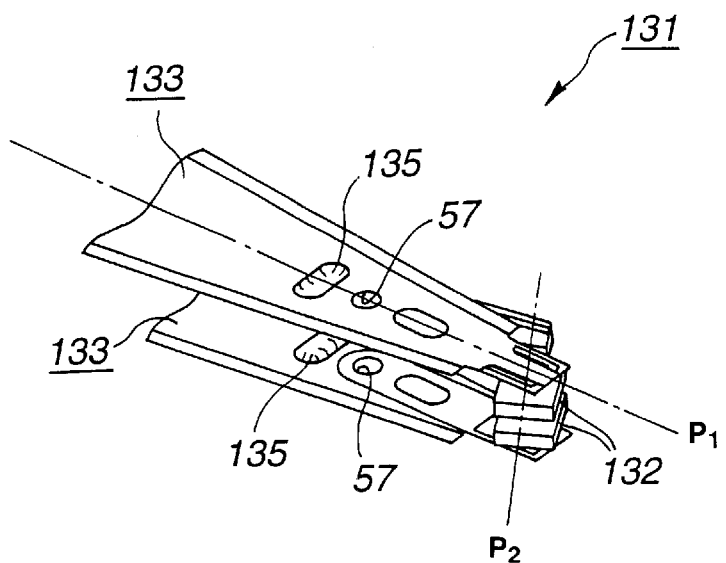
FIG. 20. is a schematic plan view of the magnetic head unit of FIG. 19, illustrating a principal portion thereof.
Figure 22:
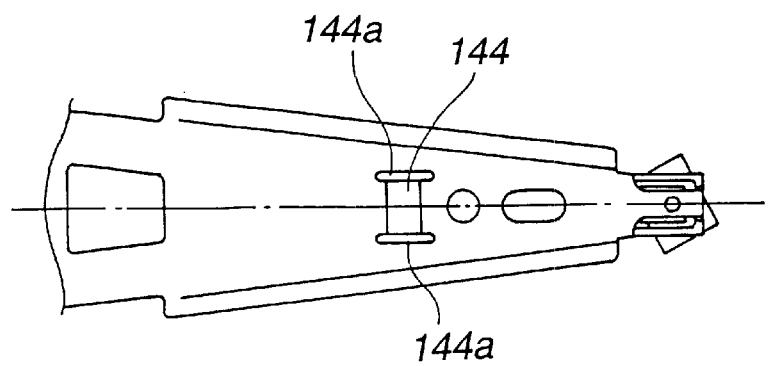
FIG. 22 is a schematic plan view of one of the head support arms of the embodiment of FIG. 20, illustrating alternative projections to be pressed that are formed on the head support arm.

Meanwhile, as shown in FIGS. 19 and 20, projections 135, 135 to be pressed against the ramp member that reliably provides the necessary gap between the head support arms 133, 133 in a manner as described hereinafter are formed on the respective head support arms 133, 133. The projections 135, 135 to be pressed against the ramp member on the respective head support arms 133, 133 are extended from the surfaces of head support arms 133, 133 that are located facing to each other. The projections 135, 135 have a substantially elliptic profile with the long axis thereof running perpendicularly relative to the center line P1 of the head support arms 133, 133 and the short axis thereof agreeing with the center line P1. The above-described projections 135, 135 may alternatively have a profile as shown in FIG. 22. Referring to FIG. 22, they are extended from the oppositely disposed sides of the head support arms 133, 133 to show a substantially rectangular profile with the long axis thereof running perpendicularly relative to the center line P1 of the head support arms 133, 133 and the short axis thereof agree with the center line P1 of FIG. 19 A pair of slits 144a, 144a are formed along the short axis of the projections 144, 144.

As shown in FIGS. 21(A)–21(C), the ramp member 136 adapted to reliably provide a necessary gap between the sliders 132, 132 when the sliders 132, 132 are moved from the stand-by position located outside the cartridge main body 4 to the recording/reproducing position located inside the cartridge main body 4 includes a ramp arm 137 to be inserted between the pair of sliders 43, 43 and a press section 138 for pressing the rotary arm 45 to move the sliders 132, 132 to the side of the disk cartridge 1 received in the cartridge receiving section 34.

As shown in FIGS. 21(A) and 21(B), the ramp arm 137 is provided with press projections 139, 139 for pressing the respective projections 135, 135 that are formed on the respective head support arms 133, 133. The press projections 139, 139 include first press sections 141, 141 adapted to press the respective projections 135, 135 the head support arms 133, 133 along the center line P1 and second press sections 142, 142 adapted to press respective sides of the projections 135, 135 located at positions offset from the center line P1 in such a way that the ends of the sliders 132, 132 located upstream in the sense of rotation of the hard disk 5 are turned upward. The sliders 132, 132 are fitted to the front ends of the respective head support arms 133, 133. The first press sections 141, 141 have a substantially arcuate profile so that they press the projections 135, 135 of the head support arms 133, 133 along the center line P1, and the head support arms 133, 133 are adapted to be driven by the rotary arm 45. On the other hand, the second press sections 142, 142 are arranged close to the front end of the ramp arm 137 practically as continuations of the first press sections 141, 141 and have a substantially linear profile so that they can press the projections 135, 135 at respective positions displaced to a side thereof. The second press sections 142, 142 are provided at the front ends thereof with respective inclined surfaces 143, 143 that allow the sliders 132, 132 to smoothly move to the recording/reproducing position and also allows the projections 135, 135 to ride thereon with ease when returning to the stand-by position. The ramp member 136 is urged toward the disk cartridge 1 received in the cartridge receiving section 34 by a coil spring as in the case of the above described ramp member 61 of FIG. 9.

Referring to FIGS. 3, 4, and 20, when the disk cartridge 1 is received in the cartridge receiving section 34 of the disk recording/reproducing device and the hard disk 5 is driven to rotate by the disk rotating/operating mechanism 36, the magnetic head unit 131 enters into the cartridge main body 4 through the recording/reproducing aperture 12. More specifically, when the sliders 132, 132 are located outside the disk cartridge 1 that is received in the cartridge receiving section 34 as shown in FIG. 21(A), the rotary arm 45 is rotated in the sense opposite to arrow D1 in FIG. 4. Under this condition, the ramp arm 137 of the ramp member 136 is placed between the head support arms 133, 133 and pressed by the first press sections 141, 141 of the press projections 139, 139 formed on the ramp arm 137 so that the head support arms 133, 133 are resiliently deformed and moved away from each other. As a result, the sliders 132, 132 are separated from and arranged in parallel with each other.

Then, as the sliders 132, 132 carrying the magnetic head elements 42, 42, see FIG. 6, at the respective front ends thereof are moved to the recording/reproducing position in the disk cartridge 1, the rotary arm 45 of the magnetic head unit 131 is pressed by the press section 138 of the ramp member 136 to rotate in the sense of arrow D1 in FIG. 21(B), and the press section 138 is urged in the sense of arrow D2 in FIG. 21(B). Then as shown in FIG. 21(B), the sliders 132, 132 are moved into the disk cartridge 1 through the recording/reproducing aperture 12 and placed at the recording/reproducing position on the hard disk 5. Then, the sliders 132, 132 are lifted slightly above the hard disk 5 by the air flow formed on the surface of the hard disk 5 that is rotating at high speed. Under this condition, the ends of the sliders 132, 132 located upstream in the sense of rotation of the hard disk 5 are turned upward as the projections 135, 135 the head support arms 133, 133 are pressed respectively by the second press sections 142, 142 at a side offset from the center line P1. As a result, the air flow can easily move under the sliders 132, 132 entering through the upwardly turned ends to prevent them from colliding with the hard disk 5 and smoothly move them to the recording/reproducing position on the hard disk 5, as they are floating above the hard disk 5.

As the rotary arm 45 is rotated further in the sense of arrow D1 in FIG. 21(B), the projections 135, 135 of the head support arms 133, 133 are moved beyond the front end of the ramp arm 137 of the ramp member 136 until they are located above the hard disk 5, as shown in FIG. 21(C). Then, the head support arms 133, 133 are released from the state where the projections 135, 135 are pressed by the second press sections 142, 142 of the press projections 139, 139 of the ramp arm 137, so that the sliders 132, 132 are also released from the state where the ends are turned upward and become substantially parallel to each other so as to allow the magnetic head elements 42, 42, see FIG. 6, to record information signals on or reproduce information signals from the hard disk 5. Thereafter, the rotary arm 45 is driven to rotate by the voice coil motor both in the sense of arrow D1 and in the sense opposite to arrow D1 in FIG. 4 to make the magnetic head elements 42, 42, see FIG. 6, of the magnetic head unit 131 actually record information signals on or reproduce information signals from the hard disk 5.

For moving the sliders 132, 132 from the recording/reproducing position back to the stand-by position in order to take the disk cartridge 1 from the disk recording/reproducing device, the above sequence is followed in reverse as might be as shown in order in FIGS. 21(C) through 21(A). More specifically, the rotary arm 45 is driven to rotate in the sense of arrow D1 in FIG. 4 by the voice coil motor 46 from the position of FIG. 21(C) to the position of FIG. 21(A). Then, as the rotary arm 45 presses the press section 138 of the ramp member 136 in the sense opposite to arrow D1 in FIG. 4 against the urging force of the coil spring, the sliders 132, 132 are moved out of the disk cartridge 1 to the stand-by position.

Thus, with the magnetic head unit 131 of the disk recording/reproducing device having the configuration as described above, the head support arms 133, 133 are pressed by the ramp arm 137 to turn the ends of the sliders 132, 132 located upstream in the sense of rotation of the hard disk 5 upward and make the sliders 132, 132 float above the hard disk 5 that is rotating at high speed, so that the sliders 132, 132 are prevented from colliding with the hard disk 5. Then, the recording/reproducing device 31 can reliably record information signals on or reproduce information signals from the hard disk 5. Additionally, with the above-described magnetic head unit 131, since the ends of the sliders 132, 132 located upstream in the sense of rotation of the hard disk 5 are turned upward only when the sliders 132, 132 are moved to the recording/reproducing position, the head support arms 133, 133 are prevented from creeping.

Figure 23:
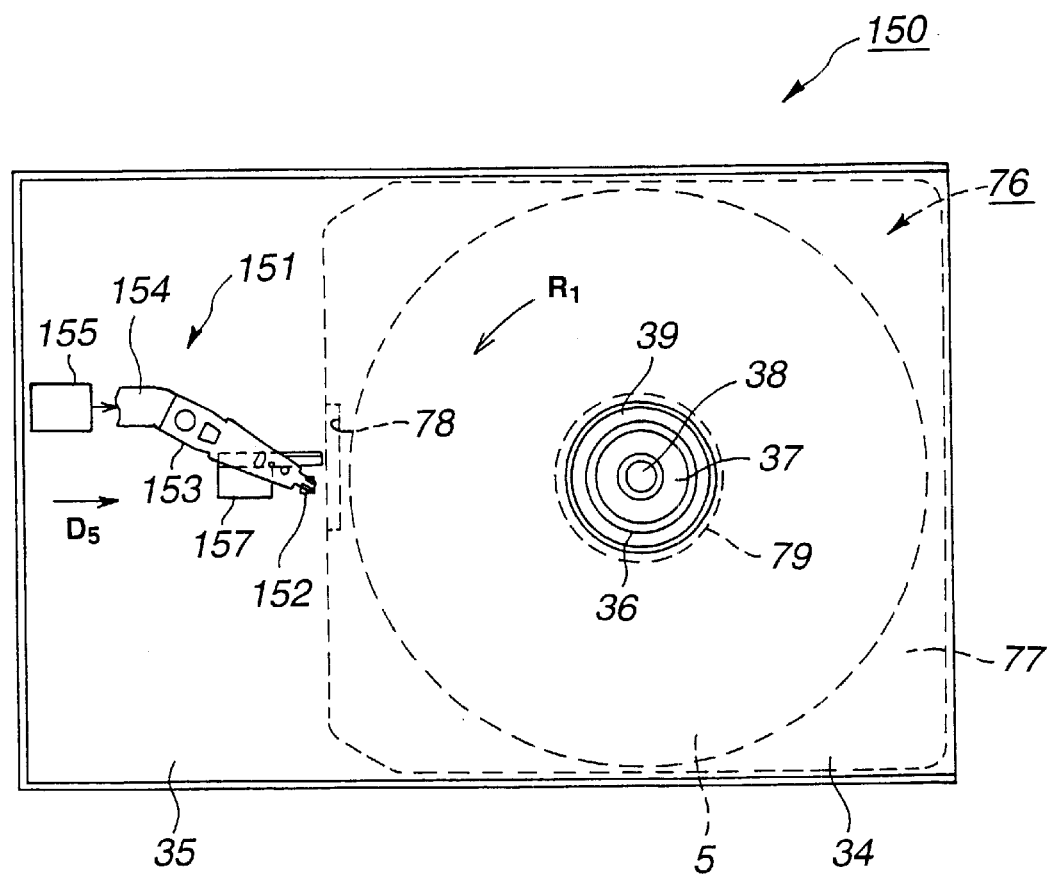
FIG. 23. is a schematic plan view of another embodiment of the disk recording/reproducing device according to the present invention.

Still another configuration of the disk recording/reproducing device to which the present invention is applied will be described below. Referring to FIG. 23, this disk recording/reproducing device 150 is characterized in that the sliders carrying magnetic head elements of the magnetic head unit are driven to move linearly. The disk recording/reproducing device 150 is adapted to be used with a disk cartridge 76 described above along with the disk recording/reproducing device 81 by referring to FIG. 12.

As shown in FIGS. 23 and 24(A)–24(C), the magnetic head unit 151 of this disk recording/reproducing device 150 comprises a pair of sliders 152, 152 carrying respective magnetic head elements 42, 42, see FIG. 6, at the front ends thereof for recording information signals on and reproducing information signals from a hard disk 5, a pair of head support arms 153, 153 carrying by turn the respective sliders 152, 152 at the front ends thereof, a traveling/operating arm 154 carrying the head support arms 153, 153 at the front ends thereof and a voice coil motor 155 for linearly driving the traveling/operating arm 154.

The traveling/operating arm 154 is arranged in such a way that they can be linearly moved by a guide member, not shown arranged at the base 35 both in the direction of arrow D5 and in the direction opposite to arrow D5 in FIG. 23 to come close to and driven away from the disk cartridge 76. The paired head support arms 153, 153 are fitted to the respective front ends of the traveling/operating arm 154 from opposite lateral sides. More specifically, the head support arms 153, 153 are bent relative to the traveling/operating arm 154 in such a way that their front ends are directed downstream in the sense of rotation of the hard disk 5 of the disk cartridge 76 received in the cartridge receiving section 34 and hence in the sense of arrow R1 in FIG. 23. With this arrangement, the paired head support arms 153, 153 are deformed in a twisted manner by the press projections of the ramp member, which will be described hereinafter, so as to turn the ends of the sliders 152, 152 located downstream in the sense of rotation of the hard disk 5 upward, because the sliders 152, 152 are fitted to the front ends of the head support arms 153, 153. Additionally, the paired head support arms 153, 153 are fitted to the front ends of the traveling/operating arm 154 in such a way that the sliders 132, 132 to the respective front ends thereof are separated by a gap that allows the hard disk 5 to be placed therebetween and prevents them from colliding with each other when the head support arms 133, 133 enter into the disk cartridge 76. The head support arms 153, 153 are formed by using leaf springs so as to operate as suspension elements. Thus, they can be resiliently deformed and bent toward and away from the signal recording surface of the hard disk 5 that is clamped by the disk rotating/operating mechanism 36. Meanwhile, projections 156, 156 to be pressed against the ramp member that reliably provides the necessary gap between the head support arms 153, 153 in a manner as described hereinafter are formed on the oppositely disposed surfaces of the respective head support arms 153, 153. The projections 156, 156 to be pressed against the ramp member on the respective head support arms 153, 153 are extended from the surfaces of head support arms 153, 153 that are located facing each other. The projections 156, 156 have a substantially elliptic profile with the long axis thereof running perpendicularly relative to the center line P1 of the head support arms 153, 153 and the short axis thereof agreeing with the center line P1.

Although not shown in detail, the voice coil motor 155 for linearly driving the traveling/operating arm 154 comprises a drive coil fitted to the base side of the traveling/operating arms and magnets arranged respectively along the opposite lateral sides of the drive coil in the direction of movement of the traveling/operating arms, so that the voice coil motor 155 drives the traveling/operating arm 154 to move linearly both in the direction of arrow D5 and in the direction opposite to arrow D5 in FIG. 23 under the effect of the drive current fed to the drive coil and the magnetic field of the magnets.

The sliders 152, 152 are fitted to the front ends of the head support arms 153, 153 in such a way that the pair of guide rails formed on the surfaces thereof located facing the hard disk 5 are arranged substantially in parallel with the hard disk 5.

Figure 24A:
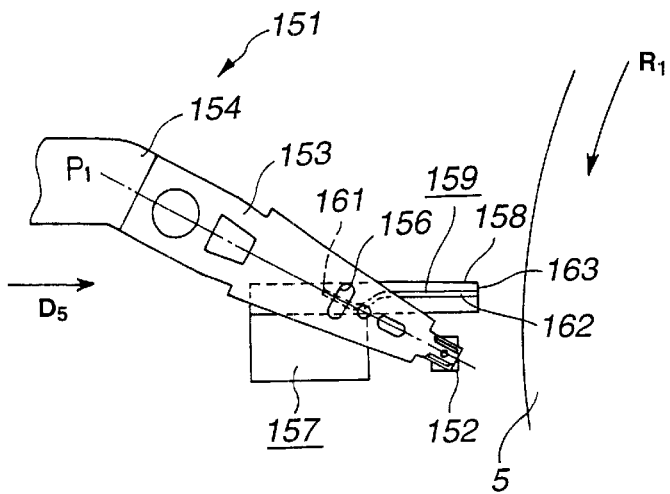
FIGS. 24(A)–24(C) are schematic plan views of a slider fitted to the front end of one of the head support arms of the embodiment of FIG. 23, illustrating how the support arm is moved from the stand-by position to the recording/reproducing position.
Figure 24B:
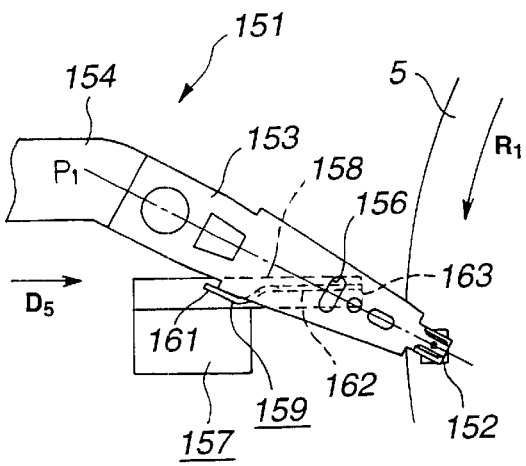
Figure 24C:
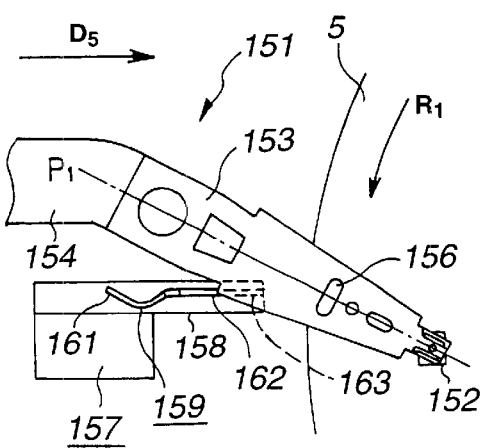

When the head support arms 153, 153 move the sliders 152, 152 from the stand-by position to the recording/reproducing position, they are resiliently deformed to turn the ends of the sliders 152, 152 located upstream in the sense of rotation of the hard disk 5 upward so that the sliders 152, 152 may move smoothly without colliding with the hard disk 5 and float above the rotating hard disk 5. As shown in FIGS. 24(A) through 24(C), the ramp member 157 for twisting and resiliently deforming the head support arms 153, 153 has a ramp arm 158 to be inserted between the paired head support arms 153, 153.

As shown in FIGS. 24(A) and 24(B), the ramp arm 158 is provided with press projections 159, 159 for pressing the respective projections 156, 156 that are arranged on the respective head support arms 153, 153. The press projections 159, 159 include first press sections 161, 161 adapted to press the respective projections 156, 156 of the head support arms 153, 153 along the center line P1 and second press sections 162, 162 adapted to press respective sides of the projections 156, 156 located at positions offset from the center line P1 in such a way that the ends of the sliders 152, 152 located upstream in the sense of rotation of the hard disk 5 are turned upward the sliders 152, 152 are fitted to the front ends of the respective head support arms 153, 153. The first press sections 161, 161 have a substantially arcuate profile so that they press the projections 156, 156 of the head support arms 153, 153 along the center line P1, the head support arms 153, 153 being adapted to be driven by the traveling/operating arm 154. On the other hand, the second press sections 162, 162 are arranged close to the front end of the ramp arm 158, practically as continuations of the first press sections 161, 161, and have a substantially linear profile so that they can press the projections 156, 156 at respective positions offset to one side thereof. The second press sections 162, 162 are provided at the front ends thereof with respective inclined surfaces 163, 163 that allow the sliders 152, 152 to smoothly move to the recording/reproducing position and also allows the projections 156, 156 to ride thereon with ease when returning to the stand-by position.

When the disk cartridge 76 is received in the cartridge receiving section 34 of the disk recording/reproducing device 150 and the hard disk 5 is driven to rotate by the disk rotating/operating mechanism 36, the magnetic head unit 151 enters into the disk cartridge 76 through the recording/reproducing aperture 78. More specifically, when the sliders 152, 152 are located outside the disk cartridge 1 that is received in the cartridge receiving section 34 as shown in FIG. 24(A), the traveling/operating arms 154, 154 is moved in the sense opposite to arrow D5 in FIG. 23. Under this condition, the ramp arm 158 of the ramp member 157 is placed between the head support arms 153, 153 and pressed by the first press sections 161, 161 of the press projections 159, 159 formed on the ramp arm 158, so that the head support arms 153, 153 are resiliently deformed and moved away from each other. As a result, the sliders 152, 152 are separated from and arranged in parallel with each other.

Then, as the sliders 152, 152 carrying the magnetic head elements 42, 42, see FIG. 6, at the respective front ends thereof are moved to the recording/reproducing position in the disk cartridge 76, the traveling/operating arm 154 is driven by the voice coil motor 155 to linearly move in the direction of arrow D5 in FIGS. 23 and 24(A). Then, the sliders 152, 152 fitted to the front ends of the head support arms 153, 153 are moved into the disk cartridge 1 through the recording/reproducing aperture 12 and placed at the recording/reproducing position on the hard disk 5. Then, the sliders 152, 152 are lifted slightly above the hard disk 5 by the air flow formed on the flat surfaces of the hard disk 5 that is rotating at high speed. Under this condition, the ends of the sliders 152, 152 located upstream in the sense of rotation of the hard disk 5 are turned upward as the projections 156, 156 of the head support arms 153, 153 are pressed respectively by the second press sections 162, 162 at a side displaced from the center line P1. As a result, the air flow can easily move under the sliders 152, 152 and entering through the upwardly turned ends to prevent them from colliding with the hard disk 5 and smoothly move them to the recording/reproducing position on the hard disk 5 as they are floating above the hard disk 5.

As the traveling/operating arm 154 is moved linearly further in the sense of arrow D5 in FIG. 24(B),the projections 156, 156 of the head support arms 153, 153 are moved beyond the front end of the ramp arm 158 of the ramp member 157 until they are located above the hard disk 5 as shown in FIG. 24(C). Then, the head support arms 153, 153 are released from the state where the projections 156, 156 are pressed by the second press sections 162, 162 of the press projections 159, 159 of the ramp arm 158, so that the sliders 152, 152 are also released from the state where the ends are turned upward to become substantially parallel to each other and allow the magnetic head elements 42, 42 to record information signals on or reproduce information signals from the hard disk 5. Thereafter, the traveling/operating arm 154 is driven by the voice coil motor to linearly move both in the sense of arrow D5 and in the sense opposite to arrow D5 in FIG. 24 to make the magnetic head elements 42, 42, see FIG. 6, of the magnetic head unit 151 actually record information signals on or reproduce information signals from the hard disk 5.

For moving the sliders 152, 152 from the recording/reproducing position back to the stand-by position in order to take the disk cartridge 76 from the disk recording/reproducing device 150, the above sequence is reversed, as shown in FIGS. 21(C) through 21(A). More specifically, the traveling/operating arms 154, 154 are driven to linearly move in the sense of arrow D5 in FIGS. 24 (A) through 24(C) by the voice coil motor 155 from the position of FIG. 24(C)position of FIG. 21(A). Then, the traveling/operating arm 154 causes the sliders 132, 132 to be moved out of the disk cartridge 76 to the stand-by position.

Thus, with the magnetic head unit 151 of the disk recording/reproducing device 150 having the configuration as described above, the head support arms 153, 153 are pressed by the ramp arm 158 to turn the ends of the sliders 152, 152 located upstream in the sense of rotation of the hard disk 5 upward and make the sliders 152, 152 float above the hard disk 5 that is rotating at high speed, so that the sliders 152, 152 are prevented from colliding with the hard disk 5. Then, the recording/reproducing device 150 can reliably record information signals on or reproduce information signals from the hard disk 5. Additionally, with the above-described magnetic head unit 150, since the ends of the sliders 152, 152 located upstream in the sense of rotation of the hard disk 5 are turned upward only when the sliders 152, 152 are moved to the recording/reproducing position, the head support arms 153, 153 are prevented from creeping.

Figure 25:
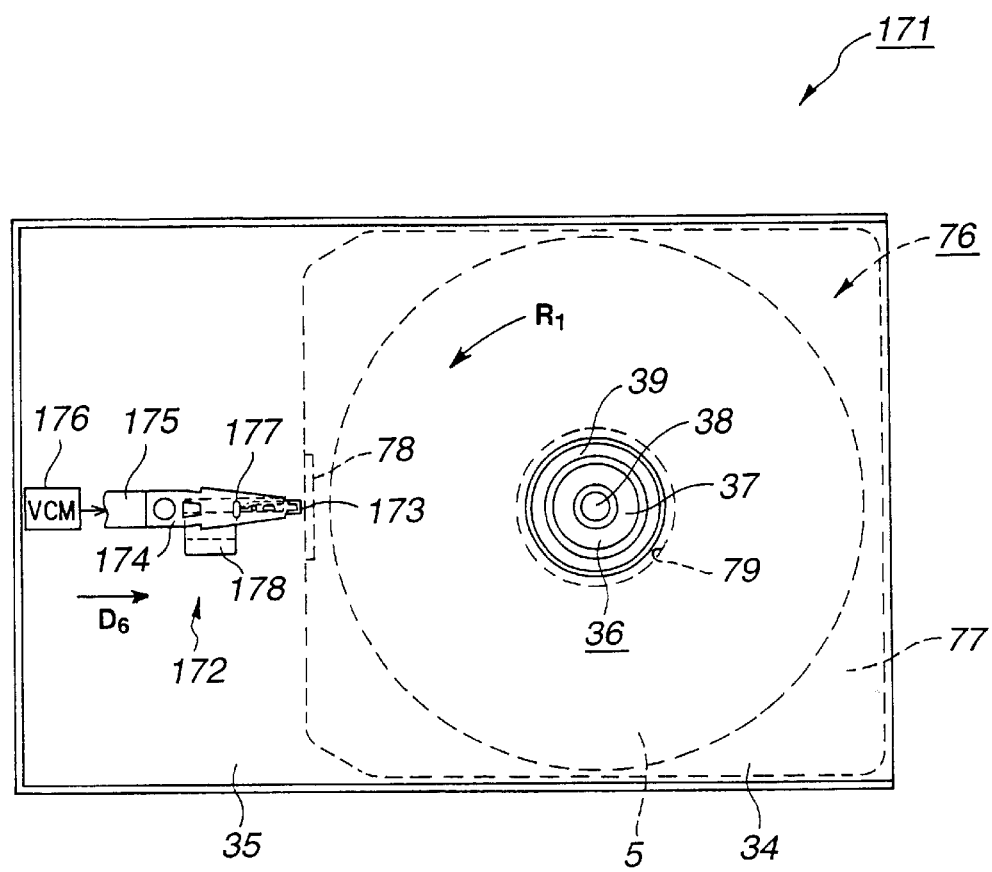
FIG. 25 is a schematic plan view of another embodiment of a disk recording/reproducing device according to the present invention.

Still another configuration of the disk recording/reproducing device to which the present invention is applied will be described below. Referring to FIG. 25, this disk recording/reproducing device 171 is characterized in that the sliders carrying magnetic head elements of its magnetic head unit 172 are driven to move linearly. The disk recording/reproducing device 171 is adapted to be used with a disk cartridge 76 described above along with the disk recording/reproducing device 81 by referring to FIG. 12.

As shown in FIGS. 25 and 26, the magnetic head unit 171 of this disk recording/reproducing device 170 comprises a pair of sliders 173, 173 carrying respective magnetic head elements 42, 42, see FIG. 6, at the front ends thereof for recording information signals on and reproducing information signals from a hard disk 5, a pair of head support arms 174, 174 carrying by turn the respective sliders 173, 173 at the front ends thereof, a traveling/operating arm 175 carrying the head support arms 173, 173 at the front ends thereof, and a voice coil motor 176 for linearly driving the traveling/operating arms 175, 175.

The traveling/operating arm 175 is arranged in such a way that they can be linearly moved by a guide member, not shown, arranged at the base 35 both in the direction of arrow D6 and in the direction opposite to arrow D6 in FIG. 25. The paired head support arms 174, 174 are fitted to the respective front ends of the traveling/operating arm 175 from opposite lateral sides. More specifically, the head support arms 174, 174 are fitted to the front ends of the respective traveling/operating arm 175 in such a way that the hard disk 5 cannot intrude between them and the sliders 173, 173 fitted to the front ends of the head support arms 174, 174 are separated from each other with a gap that prevents the sliders 173, 173 from colliding with each other when the head support arms 174, 174 enter into the cartridge main body 77. The head support arms 174, 174 are formed by using leaf springs so as to operate as suspension elements. Thus, they can be resiliently deformed and bent toward and away from the signal recording surface of the hard disk 5 that is clamped by the disk rotating/operating mechanism 36. Meanwhile, a pair of guide rails are formed at the front ends of the head support arms 174, 174 on the surfaces thereof facing the hard disk 5 of the sliders 173, 173 fitted to the front ends of the head support arms 174, 174. The paired guide rails are arranged substantially in parallel with the recording tracks of the hard disk 5.

Although not shown in detail, the voice coil motor 176 for linearly driving the traveling/operating arm 175 carrying the respective head support arms 174, 174 which by turn carry the sliders 173, 173 at the front ends thereof comprises a drive coil fitted to the base side of the traveling/operating arm 175 and magnets arranged respectively along the opposite lateral sides of the drive coil in the direction of movement of the traveling/operating arm 175 so that it drives the traveling/operating arm 175 to move linearly both in the direction of arrow D6 and in the direction opposite to arrow D6 in FIG. 25 under the effect of the drive current fed to the drive coil and the magnetic field of the magnets.

When the head support arms 174, 174 move the sliders 173, 173 from the stand-by position to the recording/reproducing position, they are resiliently deformed to turn the ends of the sliders 173, 173 located upstream in the sense of rotation of the hard disk 5 upward so that the sliders 173, 173 may move smoothly without colliding with the hard disk 5 and float above the rotating hard disk 5. Projections 177, 177 to be pressed against the ramp member that reliably provides the necessary gap between the head support arms 174, 174 in a manner as described hereinafter are formed on the oppositely disposed surfaces of the respective head support arms 174, 174. The projections 177, 177 to be pressed against the ramp member on the respective head support arms 174, 174 are arranged oppositely relative to each other and extended from the surfaces of head support arms 174, 174 that are located facing relative to each other. The projections 177, 177 have a substantially elliptic profile with the long axis thereof running perpendicularly relative to the center line P1 of the head support arms 174, 174 and the short axis thereof agreeing with the center line P1.

Figure 26A:
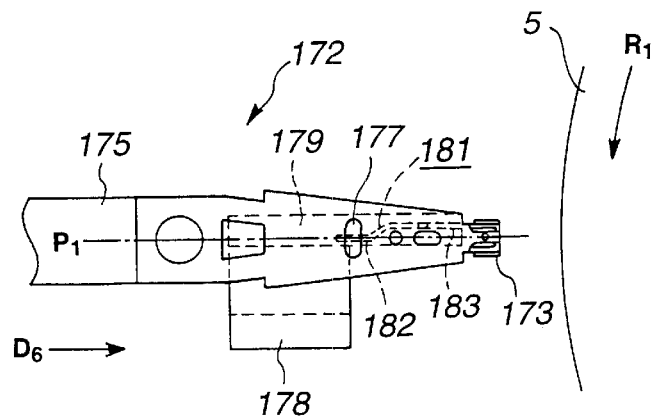
FIGS. 26(A)–26(C) are schematic plan views of a slider fitted to the front end of one in the head support arms in the embodiment of FIG. 25, illustrating how the support arm is moved from the stand-by position to the recording/reproducing position.
Figure 26B:
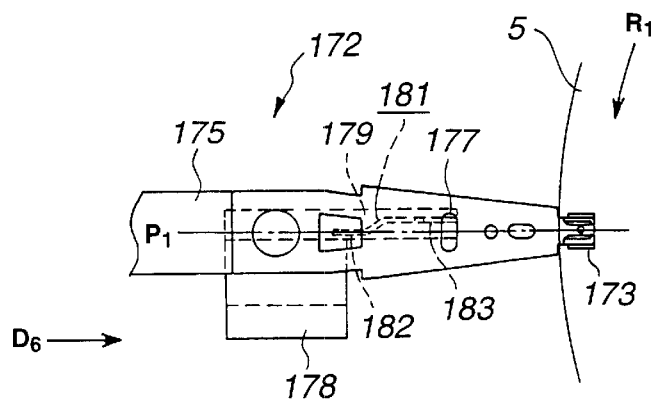
Figure 26C:
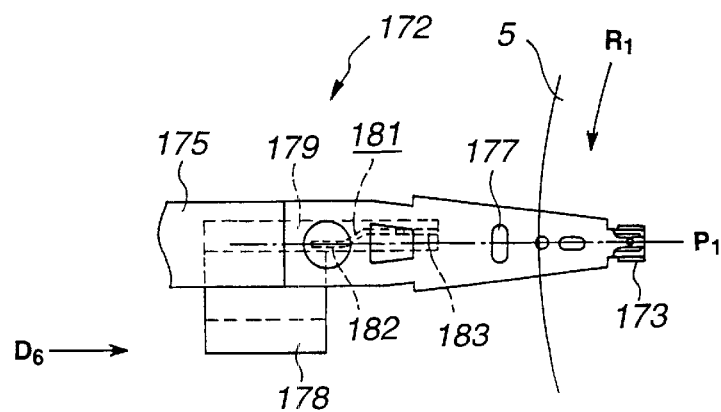

The ramp member 178 for twisting and resiliently deforming the head support arms 174, 174 comprises a ramp arm 179 to be inserted between the paired head support arms 174, 174 as shown in FIGS. 26(A) through 26(C).

As shown in FIGS. 26(A) and 26(B), the ramp arm 179 is provided with press projections 181, 181 for pressing the respective projections 177, 177 that are arranged on the respective head support arms 174, 174. The press projections 181, 181 include first press sections 182, 182 adapted to press the respective projections 177, 177 the head support arms 174, 174 along the center line P1 and second press sections 183, 183 adapted to press respective sides of the projections 177, 177 located at positions offset from the center line P1 in such a way that the ends of the sliders 173, 173 located upstream in the sense of rotation of the hard disk 5 are turned upward, said sliders 173, 173 being fitted to the front ends of the respective head support arms 174, 174. The first press sections 182, 182 are arranged on the center line P1 so that they may press the projections 177, 177 to be pressed of the head support arms 174, 174 along the center line P1, the head support arms 174, 174 being adapted to be driven to move by the traveling/operating arm 175. On the other hand, the second press sections 183, 183 are arranged close to the front end of the ramp arm 179, practically as continuations of the first press sections 182, 182, and have a substantially linear profile so that they can press the projections 177, 177 at respective positions offset from the center line P1 to a side thereof.

When the disk cartridge 76 is received in the cartridge receiving section 34 of the disk recording/reproducing device 171 and the hard disk 5 is driven to rotate by the disk rotating/operating mechanism 36, the magnetic head unit 172 enters into the disk cartridge 76 through the recording/reproducing aperture 78. More specifically, when the sliders 173, 173 are located outside the disk cartridge 1 that is received in the cartridge receiving section 34 as shown in FIG. 26(A), the traveling/operating arm 175 is moved in the sense opposite to arrow D6 in FIG. 25. Under this condition, the ramp arm 179, of the ramp member 178 is placed between the head support arms 174, 174 and pressed by the first press sections 182, 182 of the press projections 181, 181 formed on the ramp arm 179 so that the head support arms 174, 174 are resiliently deformed and moved away from each other. As a result, the sliders 173, 173 are separated from and arranged in parallel with each other.

Then, as the sliders 173, 173 carrying the magnetic head elements 42, 42 at the respective front ends thereof are moved to the recording/reproducing position in the disk cartridge 76, the traveling/operating arm 175 is driven by the voice coil motor 176 to linearly move in the direction of arrow D6 in FIGS. 25 and 26(A). Then, the sliders 173, 173 fitted to the front ends of the head support arms 174, 174 are moved into the disk cartridge 1 through the recording/reproducing aperture 78 and placed at the recording/reproducing position on the hard disk 5. Then, the sliders 173, 173 are lifted slightly above the hard disk 5 by the air flow formed on the flat surfaces of the hard disk 5 that is rotating at high speed. Under this condition, the ends of the sliders 173, 173 located upstream in the sense of rotation of the hard disk 5 are turned upward as the projections 177, 177 to be pressed of the head support arms 174, 174 are pressed respectively by the second press sections 183, 183 at a side displaced from the center line P1. As a result, the air flow can easily move under the sliders 173, 173 entering through the upwardly turned ends to prevent them from colliding with the hard disk 5 and smoothly move them to the recording/reproducing position on the hard disk 5 as they are floating above the hard disk 5. As the traveling/operating arm 175 is moved linearly further in the sense of arrow D6 in FIG. 26(B), the projections 177, 177 to be pressed of the head support arms 174, 174 are moved beyond the front end of the ramp arm 179 of the ramp member 178 until they are placed above the hard disk 5 as shown in FIG. 26(C). Then, the head support arms 174, 174 are released from the state where the projections 177, 177 are pressed by the second press sections 183, 183 of the press projections 181, 181 of the ramp arm 179 so that the sliders 173, 173 are also released from the state where the ends are turned upward to become substantially parallel to each other and allow the magnetic head elements 42, 42 to record information signals on or reproduce information signals from the hard disk 5. Thereafter, the traveling/operating arm 175 is driven by the voice coil motor 176 to linearly move both in the sense of arrow D6 and in the sense opposite to arrow D6 in FIG. 25 to make the magnetic head elements 42, 42 of the magnetic head unit 172 actually record information signals on or reproduce information signals from the hard disk 5.

While the present invention is described above in terms of disk recording/reproducing devices adapted to be used with a disk cartridge as recording medium by referring to the accompanying drawings, the present invention is by no means limited thereto and may also be applied to disk recording/reproducing devices containing a hard disk as integral part thereof.

As described above, in a recording and/or reproducing device according to the invention, the ramp member moves the head support arms to the recording/reproducing position while twisting them so as to make the ends of the sliders located upstream in the sense of rotation of the disk-shaped recording medium turn upward, said slider being fitted to the respective head support arms. Under this condition, an air flow is formed on the disk-shaped recording medium that is driven to rotate by the disk rotating/operating mechanism. Since the ends of the sliders are turned upward relative to the disk-shaped recording medium, the air flow can easily move under the sliders from those ends thereof. Thus, when the sliders are moved onto the disk-shaped recording medium, they can move very smoothly and are prevented from colliding with the disk-shaped recording medium so that the risk of damaging the magnetic head elements fitted to the sliders and the disk-shaped recording medium is reliably avoided.

What is claimed is:

1. A recording and/or reproducing device for recording information to and/or reproducing information from a disk-shaped recording medium, comprising:

a disk rotating/operating mechanism for rotating said disk-shaped recording medium;

a slider mounted with a magnetic head element;

a head support arm to which said slider is mounted and which is biased toward said disk-shaped recording medium;

a ramp member for guiding said slider mounted to said head support arm from a stand-by position to a recording/reproducing position for recording information signals to or reproducing information signals from said disk-shaped recording medium, wherein said head support arm includes a portion pressed by said ramp member, and said portion includes a dome-shaped projection arranged at a position offset from a centerline of said head support arm; and drive means for driving said magnetic head element across said disk-shaped recording medium rotated by said disk rotating/operating mechanism between an inner periphery and an outer periphery of said disk-shaped recording medium, wherein said ramp member elevates said head support arm in a twisted state by cooperating with said offset dome-shaped projection so as to make a leading edge of said slider face upward relative to said disk-shaped recording medium when said slider is driven between said stand-by position and said recording/reproducing position, and said slider is mounted to said head support arm so as to make an angle between said centerline of said head support arm and a centerline of said slider to be between 45° and 135°.

2. The recording and/or reproducing device according to claim 1, wherein said drive means rotates said head support arm between said inner periphery and said outer periphery of said disk-shaped recording medium.

3. The recording and/or reproducing device according to claim 1, wherein said drive means drives said head support arm linearly between said inner periphery and said outer periphery of said disk-shaped recording medium.

4. The recording and/or reproducing device according to claim 1, wherein said slider and said head support arm are arranged at a first side of said disk-shaped recording medium, and an other slider and an other head support arm are arranged at a second side of said disk-shaped recording medium.

5. The recording and/or reproducing device according to claim 4, wherein said ramp member elevates said head support arms provided at both sides of said disk-shaped recording medium in said twisted state.

6. A recording and/or reproducing device for recording information to and/or reproducing information from a disk-shaped recording medium, comprising:

a disk rotating/operating mechanism for rotating said disk-shaped recording medium;

a slider mounted with a magnetic head element;

a head support arm to which said slider is mounted and which is biased toward said disk-shaped recording medium;

a ramp member for guiding said slider mounted to said head support arm from a stand-by position to a recording/reproducing position for recording information signals to or reproducing information signals from said disk-shaped recording medium, wherein said head support arm includes a portion pressed by said ramp member, and said portion comprises an offset dome-shaped projection having a short axis parallel to a centerline of said head support arm and a long axis perpendicular to said centerline and said ramp member is provided with a first pressing section held in abutment with said projection at said short axis when said slider is in said stand-by position and a second pressing section held in abutment with said projection at a position displaced from said short axis when said slider is driven between said stand-by position and said recording/reproducing position, said first and second pressing sections being arranged continuously; and drive means for driving said magnetic head element across said disk-shaped recording medium rotated by said disk rotating/operating mechanism between an inner periphery and an outer periphery of said disk-shaped recording medium, wherein said ramp member elevates said head support arm in a twisted state by cooperating with said offset dome-shaped projection so as to make a leading edge of said slider face upward relative to said disk-shaped recording medium when said slider is driven between said stand-by position and said recording/reproducing position, and said slider is mounted to said head support arm so as to make an angle between said centerline of said head support arm and a centerline of said slider to be between 45° and 135°.

* * * * *